United States Patent
Izuhara et al.

(10) Patent No.: US 9,653,745 B2
(45) Date of Patent: May 16, 2017

(54) BLOCK COPOLYMER, MANUFACTURING METHOD THEREFOR, AND POLYMER ELECTROLYTE MATERIAL, MOLDED POLYMER ELECTROLYTE, AND SOLID-POLYMER FUEL CELL USING SAID BLOCK COPOLYMER

(75) Inventors: Daisuke Izuhara, Otsu (JP); Hiroaki Umeda, Otsu (JP); Emi Amano, Otsu (JP); Tomoyuki Kunita, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 354 days.

(21) Appl. No.: 14/187,243

(22) PCT Filed: Aug. 21, 2012

(86) PCT No.: PCT/JP2012/071078
§ 371 (c)(1),
(2), (4) Date: Feb. 22, 2014

(87) PCT Pub. No.: WO2013/027724
PCT Pub. Date: Feb. 28, 2013

(65) Prior Publication Data
US 2014/0193742 A1    Jul. 10, 2014

(30) Foreign Application Priority Data

Aug. 23, 2011 (JP) .................................. 2011-181315
Aug. 31, 2011 (JP) .................................. 2011-188358

(51) Int. Cl.
*H01M 8/102* (2016.01)
*H01M 8/1025* (2016.01)
*H01B 1/12* (2006.01)
*H01M 8/1069* (2016.01)
*C08J 5/22* (2006.01)
*C08G 65/40* (2006.01)
*C08G 65/48* (2006.01)
*H01M 8/0289* (2016.01)

(52) U.S. Cl.
CPC ........ *H01M 8/1025* (2013.01); *C08G 65/405* (2013.01); *C08G 65/4012* (2013.01); *C08G 65/4025* (2013.01); *C08G 65/4037* (2013.01); *C08G 65/4056* (2013.01); *C08G 65/48* (2013.01); *C08J 5/2256* (2013.01); *H01B 1/122* (2013.01); *H01M 8/0289* (2013.01); *H01M 8/1083* (2013.01); *C08G 2650/40* (2013.01); *C08J 2371/12* (2013.01); *H01M 2300/0082* (2013.01); *Y02E 60/523* (2013.01); *Y02P 70/56* (2015.11)

(58) Field of Classification Search
None
See application file for complete search history.

(56) References Cited

U.S. PATENT DOCUMENTS

| | | |
|---|---|---|
| 2009/0032394 A1 | 2/2009 | Wu et al. |
| 2009/0301875 A1 | 12/2009 | Wu et al. |
| 2010/0141085 A1 | 6/2010 | Wu et al. |
| 2010/0196782 A1 | 8/2010 | Izuhara et al. |
| 2011/0065021 A1 | 3/2011 | Kitamura et al. |

FOREIGN PATENT DOCUMENTS

| | | |
|---|---|---|
| CA | 2657462 A | 2/2008 |
| CN | 101370858 A | 2/2009 |
| CN | 101485022 A | 7/2009 |
| CN | 101942104 A | 1/2011 |
| CN | 102015830 A | 4/2011 |
| EP | 2051321 A1 | 2/2008 |
| EP | 1991606 A1 | 11/2008 |
| EP | 2273113 A1 | 1/2011 |
| EP | 2289973 A1 | 3/2011 |
| JP | 2008-117754 A | 5/2008 |
| JP | 2009-523905 A | 6/2009 |
| JP | 2009-235158 A | 10/2009 |
| JP | 2011-011549 A | 1/2011 |
| JP | 2011-040370 A | 2/2011 |
| JP | 2011-063730 A | 3/2011 |
| KR | 10-2008-0091455 A | 10/2008 |
| KR | 10-2009-0040431 A | 4/2009 |
| KR | 10-2011-0003270 A | 1/2011 |
| TW | 200815518 A | 4/2008 |
| WO | 2007/084796 A2 | 7/2007 |
| WO | 2008/018487 A1 | 2/2008 |
| WO | 2009/136631 A1 | 11/2009 |
| WO | 2011/016444 A1 | 2/2011 |

*Primary Examiner* — Lucas J. O'Donnell
(74) *Attorney, Agent, or Firm* — Pillsbury Winthrop Shaw Pittman LLP

(57) ABSTRACT

To provide: a block copolymer that exhibits excellent proton conductivity even under low-humidification conditions, exhibits excellent mechanical strength and chemical stability, and when used in a polymer electrolyte fuel cell, allows high output and excellent physical durability; a polymer electrolyte material; and a polymer electrolyte form article and a polymer electrolyte fuel cell, using the same.

The block copolymer of the present invention includes each one or more of: a segment (A1) containing an ionic group; a segment (A2) not containing an ionic group; and a linker moiety connecting the segments. The segment (A1) containing an ionic group comprises a constituent unit represented by a specific structure. The polymer electrolyte material, the polymer electrolyte form article, and the polymer electrolyte fuel cell according to the present invention are manufactured by using the above block copolymer.

13 Claims, No Drawings

BLOCK COPOLYMER, MANUFACTURING METHOD THEREFOR, AND POLYMER ELECTROLYTE MATERIAL, MOLDED POLYMER ELECTROLYTE, AND SOLID-POLYMER FUEL CELL USING SAID BLOCK COPOLYMER

CROSS-REFERENCE TO RELATED APPLICATION

This application is a national phase of International application No. PCT/JP2012/071078 filed on Aug. 21, 2012 which claims priority to Japanese Patent Application No. 2011-181315 filed on Aug. 23, 2011 and Japanese patent Application No. 2011-188358 filed on Aug. 31, 2011, which are incorporated herein by reference.

TECHNICAL FIELD

The present invention relates to a block copolymer, specifically to a polymer electrolyte material of high industrial applicability that exhibits excellent proton conductivity even under low-humidification conditions, exhibits excellent mechanical strength, chemical stability, and physical durability, and a method of manufacturing thereof, to a polymer electrolyte material, a polymer electrolyte form article, and a polymer electrolyte fuel cell using thereof.

BACKGROUND ART

Fuel cells are a kind of power generator which extracts electric energy through electrochemical oxidation of fuels such as hydrogen and methanol. In recent years, the fuel cells have drawn attention as a clean energy supply source. Among fuel cells, polymer electrolyte fuel cell is operated at a low standard working temperature of approximately 100° C., and provides high energy density, and thus the polymer electrolyte fuel cell is expected to be widely applied as relatively small-scale distributed power facilities and as mobile power generator on automobile, ship, and the like. In addition, the polymer electrolyte fuel cell also draws attention as power source of small-scale mobile apparatus and portable apparatus, and is expected to be mounted on cell phone, personal computer, and the like in place of nickel-hydrogen battery and lithium-ion battery.

A normal fuel cell is constituted by cell units, the cell unit having a configuration of a membrane electrode assembly (hereinafter referred to also as MEA) being sandwiched between separators, which MEA is constituted by an anode electrode and a cathode electrode in which a reaction of power generation occurs, and by a polymer electrolyte membrane serving as a proton conductor between the anode and the cathode. The polymer electrolyte membrane is mainly constituted by a polymer electrolyte material. The polymer electrolyte material is also used as a binder of an electrode catalyst layer and the like. The characteristics required of the polymer electrolyte membrane include, first, high proton conductivity, specifically high proton conductivity under high temperature and low-humidification conditions. Furthermore, since the polymer electrolyte membrane also functions as a barrier that prevents direct reaction between fuel and oxygen, low permeability of fuel is required. Other necessary characteristics include chemical stability for withstanding strong oxidizing atmosphere during operation of the fuel cell, mechanical strength and physical durability of withstanding thinning of membrane and repeated swelling-drying cycles, and the like.

Conventionally, as the polymer electrolyte membranes, there is widely used Nafion (registered trade name, manufactured by DuPont) which is a perfluoro-sulfonate-based polymer. Since Nafion (registered trade name) is manufactured through multistage of synthesis, it has problems of being extremely expensive and of large fuel-crossover (transmission amount of fuel). In addition, as to Nafion, there were pointed out a problem of losing membrane mechanical strength and physical durability by swelling-drying, a problem in which the use at high temperatures is not possible because of low softening point, a problem of waste disposal after use, and further an issue of difficulty in recycling the material.

To the situation, the development of hydrocarbon-based electrolyte membranes has been actively conducted in recent years as a polymer electrolyte material having excellent membrane characteristics at a low price substituting Nafion (registered trade name).

For example, there is provided a block copolymer having a segment not introducing sulfonic acid group and a segment introducing sulfonic acid group therein, wherein the former segment includes a polyethersulfone (PES), and the latter segment includes a sulfonated polyethersulfone, (Patent Documents 1, 2, and 3). These block copolymers, however, use an amorphous polymer having high glass transition temperature as the base skeleton, thus raising a problem of brittleness and poor physical durability, and further giving poor hot water resistance and poor physical durability because of containing a large number of sulfone group having high water absorbency.

Patent Document 3 describes a block copolymer in which the former segment is constituted by a tough polyether ketone (PEK), and the latter segment is constituted by a sulfonated polyether ether ketone. The description, however, gives the PEK only as an example of preferred structure, and does not give the synthesis of PEK segment, which does not introduce sulfonic acid group, of crystalline and insoluble in solvent. Therefore, the description is not a detailed investigation of the block copolymer. Furthermore, since the PEK contains phenylene group and biphenylene group, having high electron density and high reactivity, being sandwiched between ether groups, and since the PEK introduces sulfonic acid group into the activated above groups, there gives insufficient chemical stability to oxidation deterioration, desulfonation, and the like.

As described above, the polymer electrolyte materials according to related art are insufficient as means for improving economic efficiency, processability, proton conductivity, mechanical strength, chemical stability, and physical durability, thus they cannot serve as industrially useful polymer electrolyte materials.

CITATION LIST

Patent Literature

Patent Document 1: Japanese Patent Laid-Open No. 2009-235158
Patent Document 2: Japanese Patent Laid-Open No. 2007-515513
Patent Document 3: Japanese Patent Laid-Open No. 2005-126684

SUMMARY OF INVENTION

Technical Problem

Responding to the background of related art, the present invention provides a block copolymer that exhibits excellent proton conductivity even under low-humidification conditions, exhibits excellent mechanical strength and chemical stability, and when used in a polymer electrolyte fuel cell, allows high output and excellent physical durability; a method of manufacturing thereof; a polymer electrolyte material; and a polymer electrolyte form article and a polymer electrolyte fuel cell using the same.

Solution to Problem

To solve the above problems, the present invention adopts the following means. That is, the block copolymer according to the present invention includes each one or more of: a segment (A1) containing an ionic group; a segment (A2) not containing an ionic group; and a linker moiety connecting the segments, wherein the segment (A1) containing an ionic group comprises a constituent unit represented by the general formula (S1). Furthermore, the polymer electrolyte material, the polymer electrolyte form article, and the polymer electrolyte fuel cell according to the present invention are constituted by the above block copolymer.

[Chemical formula 1]

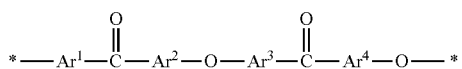

(S1)

where, in the general formula (S1), $Ar^1$ to $Ar^4$ are each an arbitrary divalent arylene group; $Ar^1$ and/or $Ar^2$ contains an ionic group; $Ar^3$ and $Ar^4$ can each contain or not contain an ionic group; $A^1$ to $Ar^4$ may each be arbitrarily substituted, and in $A^1$ to $Ar^4$, two or more kinds of arylene groups may be used independently of each other; and the symbol * signifies a bond moiety with the general formula (S1) or with other constituent unit.

Advantageous Effects of the Invention

The block copolymer, the polymer electrolyte material, and the polymer electrolyte form article and the polymer electrolyte fuel cell using the same according to the present invention exhibit excellent proton conductivity even under low-humidification conditions, exhibit excellent mechanical strength and chemical stability, and when being applied to a polymer electrolyte fuel cell, high output and excellent physical durability can be achieved.

Through the method of manufacturing the block copolymer according to the present invention, the above block copolymer can be efficiently manufactured.

BEST MODE FOR CARRYING OUT THE INVENTION

The present invention will be described below in detail.

In order to solve the above problems, the present inventors carried out a detailed study of polymer electrolyte material for fuel cell and the like, and found that a block copolymer constituted by a polyether ketone main chain skeleton, which chemically stabilizes all arylene groups by an electron-withdrawing ketone group and further which improves the physical durability through toughening by giving crystallinity and through softening by lowering the glass transition temperature, provides excellent performance of proton conductivity also under low-humidification conditions, power generation characteristic, processability such as membrane-formation, resistance to oxidation, resistance to radical, chemical stability such as hydrolysis resistance, membrane mechanical strength, and physical durability such as hot water resistance, as a polymer electrolyte material, specifically as an electrolyte membrane for fuel cell, thus solving entire issues, and the inventors further investigated, thereby perfected the present invention.

That is, the block copolymer according to the present invention includes each one or more of: a segment (A1) containing an ionic group; a segment (A2) not containing an ionic group; and a linker moiety connecting these segments, wherein the segment (A1) containing an ionic group comprises a constituent unit represented by the general formula (S1).

[Chemical formula 2]

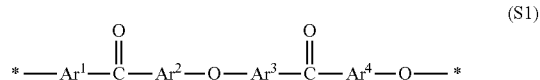

(S1)

where, in the general formula (S1), $Ar^1$ to $Ar^4$ are each an arbitrary divalent arylene group; $Ar^1$ and/or $Ar^2$ contains an ionic group; $Ar^3$ and $Ar^4$ can each contain or not contain an ionic group; $A^1$ to $Ar^4$ may each be arbitrarily substituted, and in $A^1$ to $Ar^4$, two or more kinds of arylene groups may be used independently of each other; and the symbol * signifies a bond moiety with the general formula (S1) or with other constituent unit.

As the block copolymer according to the present invention, the segment (A2) not containing an ionic group preferably comprises a constituent unit represented by the general formula (S2).

[Chemical formula 3]

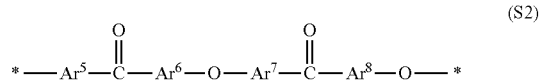

(S2)

where, in the general formula (S2), $Ar^5$ to $Ar^8$ are each an arbitrary divalent arylene group, which $Ar^5$ to $Ar^8$ may each be arbitrarily substituted, and do not contain an ionic group; in $Ar^5$ to $Ar^8$, two or more kinds of arylene groups may be used independently of each other; and the symbol * signifies a bond moiety with the general formula (S2) or with other constituent unit.

The divalent arylene group preferred as $Ar^1$ to $Ar^8$ includes hydrocarbon-based arylene group such as phenylene group, naphthylene group, biphenylene group, and fluorine diyl group, and heteroarylene group such as pyridine diyl, quinoxaline diyl, and thiophene diyl, though not necessarily limited thereto.

The $Ar^1$ and/or $Ar^2$ contain/contains an ionic group, and $Ar^3$ and $Ar^4$ can contain or not-contain an ionic group. Although $Ar^1$ to $Ar^4$ can be substituted by a group other than ionic group, non-substitution is preferred from the viewpoint of proton conductivity, chemical stability, and physical durability, further preferred group is phenylene group and phenylene group containing an ionic group, and most preferable group is p-phenylene group and p-phenylene group containing an ionic group.

According to the present invention, the term "segment" means a partial structure in the block copolymer, which includes combination of repeating units of single kind or of repeating units of several kinds, having molecular weights of 2000 or larger. The block copolymer according to the present invention contains both the segment (A1) containing an ionic group and the segment (A2) not containing an ionic group. Although the present invention describes "segment not containing an ionic group", the segment (A2) can contain a small quantity of ionic group within a range of not affecting reversely the effect of the present invention. Hereinafter the term "not containing an ionic group" is used in a similar meaning as above, in some cases.

According to the present invention, the term "linker" means a moiety to connect the segment (A1) containing an ionic group with the segment (A2) not containing an ionic group, and is defined as a moiety having a chemical structure different from that of the segment (A1) containing an ionic group and from that of the segment (A2) not containing an ionic group. The linker can connect different segments while suppressing randomizing, segment cutting, and side reactions in the ether-exchange reaction, thus the linker is necessary to obtain the block copolymer according to the present invention. If the linker is absent, segment cutting such as randomizing may occur, which fails to attain perfect effect of the present invention.

The block copolymer according to the present invention forms a single polymer chain by connecting two or more kinds of segments insoluble to each other, that is a hydrophilic segment containing an ionic group and a hydrophobic segment not containing an ionic group, at the linker moiety thereof. In the block copolymer, the short-range interaction generated from repellence between chemically-different segment chains generates phase separation into nano- or micro-domains formed of the respective segment chains, and the long-range interaction generated from covalent bond of segment chains with each other allows the individual domains to be arranged in a specific order. The higher structure created by the gathering of domains formed of individual segments is called the "nano- or micro-phase separated structure", and as to the ion conduction through the polymer electrolyte membrane, the space arrangement of ion-conductive segments in the membrane, that is, nano- or micro-phase separated structure becomes important. The term "domain" means a lump formed by cohesion of similar segments in a single or plurality of polymer chains.

The block copolymer according to the present invention can attain excellent chemical durability and physical durability, and excellent ion conductivity, specifically high proton conductivity even under low-humidification conditions by forming the chemical structure in which the segment (A1) containing an ionic group and the segment (A2) not containing an ionic group comprises constituent unit represented by the respective general formula (S1) and (S2), and further by controlling nano- or micro-phase separated structure as the polymer higher structure.

By adequately selecting the chemical structure, the segment chain length, the molecular weight, the ion-exchange capacity, and the like of the block copolymer according to the present invention, there can be controlled the processability, the domain size, the crystallinity/amorphous property, the mechanical strength, the proton conductivity, the dimensional stability, and the like of the polymer electrolyte material.

Next, as to the block copolymer according to the present invention, preferred specific examples will be described below. The block copolymer according to the present invention exhibits high proton conductivity under a wide humidity condition as the polymer electrolyte material and as the polymer electrolyte membrane, since the segment (A1) containing an ionic group forms the domain.

The ionic group used in the block copolymer according to the present invention is preferably an atomic group having negative potential, and more preferably the one having proton-exchange ability. That type of functional group preferably includes sulfonic acid group, sulfone-imide group, sulfuric acid group, phosphonic acid group, phosphoric acid group, and carboxylic acid group. The sulfonic acid group means a group represented by the general formula (f1), the sulfone-imide group means a group represented by the general formula (f2) (R in the general formula (f2) is an arbitrary organic group), sulfuric acid group means a group represented by the general formula (f3), phosphonic acid group means a group represented by the general formula (f4), phosphoric acid group means a group represented by the general formula (f5) or the general formula (f6), and carboxylic acid group means a group represented by the general formula (f7).

[Chemical formula 4]

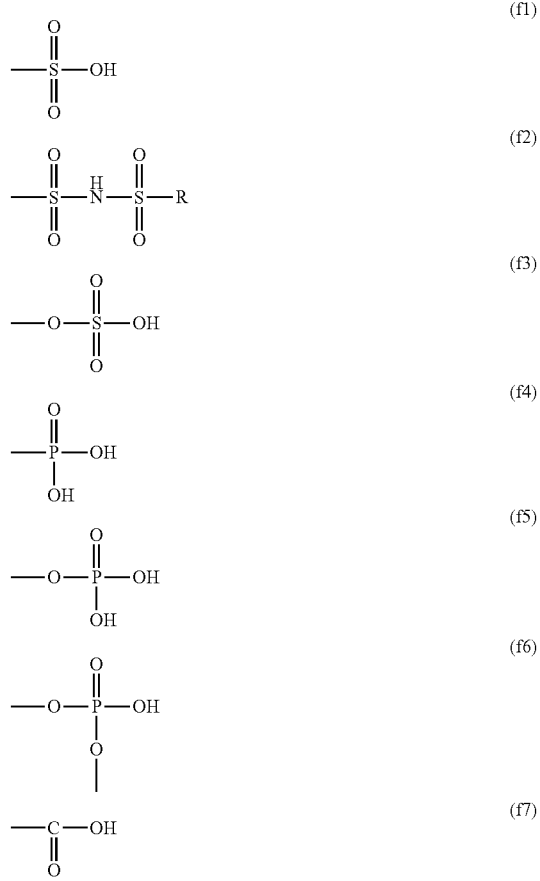

Such ionic groups include the ones in which the functional groups (f1) to (f7) are the respective salts. The cations that form these salts can include arbitrary metal cation and $NR_4^+$ (R is an arbitrary organic group). The metal cation can be used without limitation of the number of valence, and the like. Specific examples of preferable metal cations include Li, Na, K, Rh, Mg, Ca, Sr, Ti, Al, Fe, Pt, Rh, Ru, Ir, Pd, and the like. Among these, Na, K, and Li which are inexpensive and easily capable of proton substitution are preferably used for the block copolymer according to the present invention.

The polymer electrolyte material can contain two or more kinds of these ionic groups, and the combination thereof is adequately determined by the polymer structure and the like. Among these groups, at least, sulfonic acid group, sulfone imide group, and sulfuric acid group are preferably contained from the viewpoint of high proton conductivity, and, from the viewpoint of raw material cost, containing sulfonic acid group is most preferable.

When the block copolymer according to the present invention contains sulfonic acid group, the ion-exchange capacity thereof is preferably in a range of 0.1 to 5 meq/g from the viewpoint of balance between the proton conductivity and the water resistance, more preferably 1.5 meq/g or larger, further preferably 1.8 meq/g or larger, and most preferably 2.1 meq/g or larger. The ion-exchange capacity of the block copolymer is preferably 3.5 meq/g or smaller, more preferably 2.9 meq/g or smaller, further preferably 2.6 meq/g or smaller, and most preferably 2.3 meq/g or smaller. When the ion-exchange capacity is smaller than 0.1 meq/g, the proton conductivity becomes insufficient in some cases, and when then ion-exchange capacity is larger than 5 meq/g, the water resistance becomes insufficient in some cases.

According to the block copolymer of the present invention, the molar composition ratio of the segment (A1) containing an ionic group to the segment (A2) not containing an ionic group, (A1/A2), is preferably 0.2 or larger, more preferably 0.33 or larger, and most preferably 0.5 or larger. In addition, the molar composition ratio (A1/A2) is preferably 5 or smaller, more preferably 3 or smaller, and most preferably 2 or smaller. When the molar composition ratio (A1/A2) is smaller than 0.2 or larger than 5, the effect of the present invention becomes insufficient in some cases, and further the proton conductivity under low-humidification conditions becomes insufficient, and the hot water resistance and the physical durability become insufficient in some cases, which is unfavorable.

From the viewpoint of proton conductivity under low-humidification conditions, the ion-exchange capacity of the segment (A1) containing an ionic group is preferably high, more preferably 2.5 meq/g or larger, further preferably 3 meq/g or larger, and most preferably 3.5 meq/g or larger. In addition, the ion-exchange capacity thereof is preferably 6.5 meq/g or smaller, more preferably 5 meq/g or smaller, and most preferably 4.5 meq/g or smaller. When the ion-exchange capacity of the segment (A1) containing an ionic group is smaller than 2.5 meq/g, the proton conductivity under low-humidification conditions becomes insufficient in some cases, and when the ion-exchange capacity thereof exceeds 6.5 meq/g, the hot water resistance and the physical durability become insufficient in some cases, both of which are unfavorable.

Lower ion-exchange capacity of the segment (A2) not containing an ionic group is preferable from the viewpoint of hot water resistance, mechanical strength, dimensional stability, and physical durability, more preferably 1 meq/g or smaller, further preferably 0.5 meq/g or smaller, and most preferably 0.1 meq/g or smaller. When the ion-exchange capacity of the segment (A2) not containing an ionic group exceeds 1 meq/g, hot water resistance, mechanical strength, dimensional stability, and physical durability become insufficient in some cases, which is unfavorable.

The term "ion-exchange capacity" referred to herein means the molar quantity of introduced sulfonic acid group per unit dry weight of the block copolymer, the polymer electrolyte material, and the polymer electrolyte membrane, respectively, and higher ion-exchange capacity means higher degree of sulfonation. The ion-exchange capacity can be determined by elemental analysis, neutralization titration, and the like. Although the ion-exchange capacity can be determined from S/C ratio in the elemental analysis, the determination becomes difficult when sulfur source other than the sulfonic acid group is contained. Therefore, in the present invention, the ion-exchange capacity is defined as the value obtained by the neutralization titration. As described later, the polymer electrolyte material and the polymer electrolyte membrane according to the present invention include the aspect of composite formed of the block copolymer of the present invention and other component, but in that case, the ion-exchange capacity is obtained on the basis of the entire amount of the composite.

Measurement examples of the neutralization titration are as follows. The measurements are performed three times or more, and the average of them is taken.

(1) There is wiped off the moisture on the surface of the electrolyte membrane on which proton substitution was performed and which was fully rinsed by pure water, and then the membrane is dried for 12 hours in vacuum at 100° C. After that, the dry weight of the membrane is obtained.

(2) To the electrolyte, there is added 50 mL of aqueous solution of 5% by weight of sodium sulfate, and the resultant solution is allowed to stand for 12 hours for conducting ion-exchange.

(3) The generated sulfuric acid is titrated using aqueous solution of 0.01 mol/L sodium hydroxide. To the solution, commercially available 0.1 w/v % phenolphthalein solution for titration is added as the indicator, and the end point is set to be a point at which the color changes to light reddish violet.

(4) The ion-exchange capacity is obtained by the following formula.

Ion-exchange capacity (meq/g)=[Concentration of aqueous solution of sodium hydroxide (mmol/mL)×(Titration amount (mL))]/[Dry weight of sample (g)]

The method of introducing an ionic group for obtaining the block copolymer according to the present invention includes: a method of performing polymerization by using a monomer containing an ionic group; and a method of introducing anionic group through a polymer reaction.

As the method of performing polymerization by using a monomer containing an ionic group, a monomer containing an ionic group in the repeating units may be used. Such method is, for example, disclosed in Journal of Membrane Science, 197, 2002, p. 231-242. The method is easy in controlling the ion-exchange capacity of polymer and is easy in application in industry, and thus the method is specifically preferred.

The method of introducing an ionic group by polymer reaction will be described below referring to examples. Introduction of a phosphonic acid group into an aromatic polymer can be done by, for example, the method described in Polymer Preprints, Japan, 51, 2002, p. 750. Introduction of a phosphoric acid group into an aromatic polymer can be done by, for example, phosphoric acid esterification of an aromatic polymer containing a hydroxyl group. Introduction of a carboxylic acid group into an aromatic polymer can be done by, for example, oxidation of an aromatic polymer containing an alkyl group and a hydroxy alkyl group. Introduction of a sulfuric acid group into an aromatic polymer can be done by, for example, sulfuric acid esterification of an aromatic polymer containing a hydroxyl group. As the method of sulfonating an aromatic polymer, or the method of introducing a sulfonic acid group, there can be used, for example, the one described in Japanese Patent Laid-Open No. 02-16126 or Japanese Patent Laid-Open No. 02-208322.

Specifically, for example, sulfonation can be performed by causing to react with a sulfonation agent such as chlorosulfonic acid in a solvent such as chloroform, or by causing an aromatic polymer to react in concentrated sulfuric acid or oleum. The sulfonation agent is not specifically limited if only the agent can sulfonate the aromatic polymer, and other than the above, sulfur trioxide and the like can be used. In the case of sulfonating an aromatic polymer by the above method, the degree of sulfonation can be controlled by the use amount of the sulfonation agent, the reaction temperature, and the reaction time. Introduction of a sulfone imide group into an aromatic polymer can be done by, for example, a method of causing an aromatic polymer to react with a sulfonic acid group and a sulfone amide group.

Next, in the block copolymer according to the present invention, the segment (A2) not containing an ionic group is preferably a constituent unit exhibiting crystallinity from the viewpoint of chemical stability and strong intermolecular cohesive force, and the segment (A2) makes it possible to obtain a block copolymer having excellent mechanical strength, dimensional stability, and physical durability.

A specific example of more preferable constituent unit represented by the general formula (S2) which is included in the segment (A2) not containing an ionic group is a constituent unit represented by the general formula (P1) from the viewpoint of availability of raw material. Among them, from the viewpoint of mechanical strength, dimensional stability, and physical durability, due to the crystallinity, the constituent unit represented by the formula (S3) is more preferred. Larger content of the constituent unit represented by the general formula (S2) which is included in the segment (A2) not containing an ionic group is more preferable, 20 mol % or larger content is further preferable, 50 mol % or larger content is more further preferable, and 80 mol % or larger content is most preferable. When the content is smaller than 20 mol %, the effect of the present invention in terms of mechanical strength, dimensional stability, and physical durability, due to crystallinity, becomes insufficient in some cases, which is not favorable.

[Chemical formula 5]

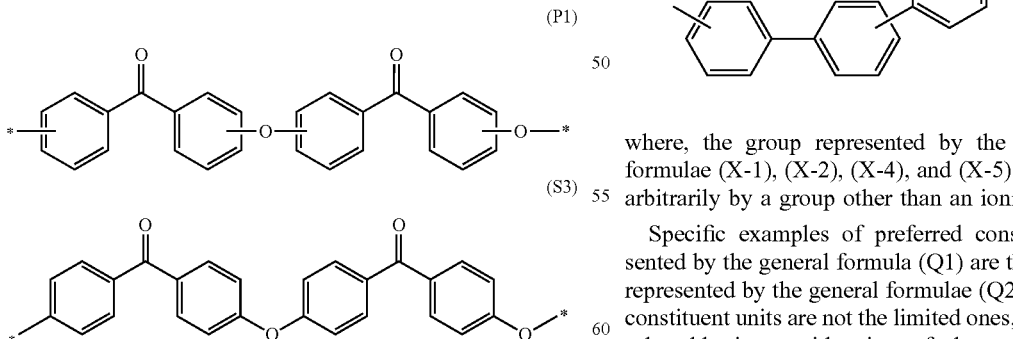

In the segment (A2) not containing an ionic group, a preferred example of constituent unit that is caused to be copolymerized other than the constituent unit represented by the general formula (S2) includes an aromatic polyether-based polymer containing a ketone group, that is, the one having the constituent unit represented by the general formula (Q1), which does not contain an ionic group.

[Chemical formula 6]

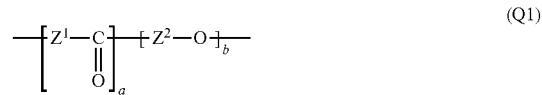

where, in the general formula (Q1), $Z^1$ and $Z^2$ are each a divalent organic group containing aromatic ring, each of them may represent two or more kinds of groups, and each of them does not contain an ionic group; and a and b are each a positive integer.

Preferred organic group as $Z^1$ and $Z^2$ in the general formula (Q1) includes the one in which $Z^1$ is phenylene group, and $Z^2$ is at least one kind selected from the general formulae (X-1), (X-2), (X-4), and (X-5). Although the organic group may be substituted by a group other than ionic group, non-substitution is more preferable from the viewpoint of addition of crystallinity. As for $Z^1$ and $Z^2$, more preferable group is phenylene group, and the most preferable one is p-phenylene group.

[Chemical formula 7]

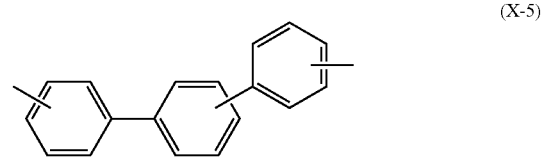

where, the group represented by the respective general formulae (X-1), (X-2), (X-4), and (X-5) may be substituted arbitrarily by a group other than an ionic group.

Specific examples of preferred constituent unit represented by the general formula (Q1) are the constituent units represented by the general formulae (Q2) to (Q7), but these constituent units are not the limited ones, and are adequately selectable in consideration of the crystallinity and the mechanical strength. Among these, from the viewpoint of crystallinity and manufacturing cost, more preferable constituent units represented by the general formula (Q1) are those represented by the general formulae (Q2), (Q3), (Q6), and (Q7), and the most preferable ones are the general formulae (Q2) and (Q7).

[Chemical formula 8]

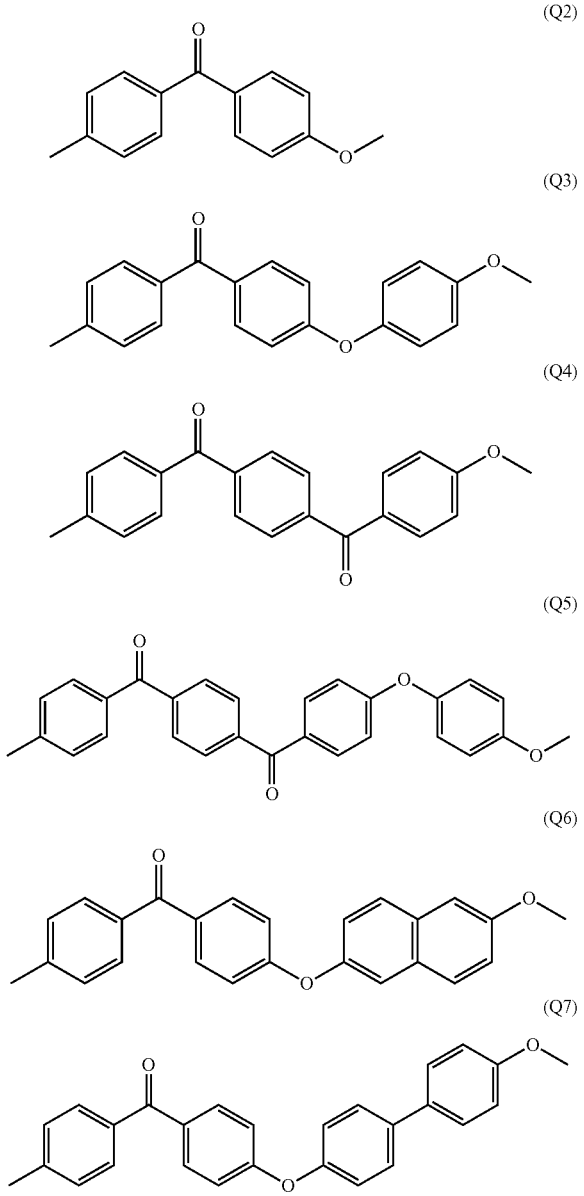

where, the general formulae (Q2) to (Q7) are expressed as compounds with binding position in the para-position, but compounds with binding position such as ortho-position, meta-position or the like may be included as long as the constituent unit has crystallinity. However, para-position is more preferable from the viewpoint of crystallinity.

In the block copolymer according to the present invention, as the segment (A1) containing an ionic group, a constituent unit is more preferable, which is chemically stable, which increases the acidity owing to the electron-withdrawing effect, and which introduces sulfonic acid group at high density. As the segment (A1), there can be obtained a block copolymer having excellent proton conductivity under low-humidification conditions.

A specific example of more preferable constituent unit represented by the general formula (S1) included in the segment (A1) containing an ionic group is the constituent unit represented by the general formula (P2) from the viewpoint of availability of raw material. Among these, from the viewpoint of availability of raw material and polymerizability, the constituent unit represented by the formula (P3) is more preferable, and the constituent unit represented by the formula (S4) is most preferable. As to the content of the constituent unit represented by the general formula (S1) included in the segment (A1) containing an ionic group, larger content is more preferable; the content of 20 mol % or larger is further preferable, the content of 50 mol % or larger is more further preferable, and the content of 80 mol % or larger is most preferable. When the content is smaller than 20 mol %, the effect of the present invention on chemical stability and proton conductivity under low-humidification condition becomes insufficient in some cases, which is not favorable.

[Chemical formula 9]

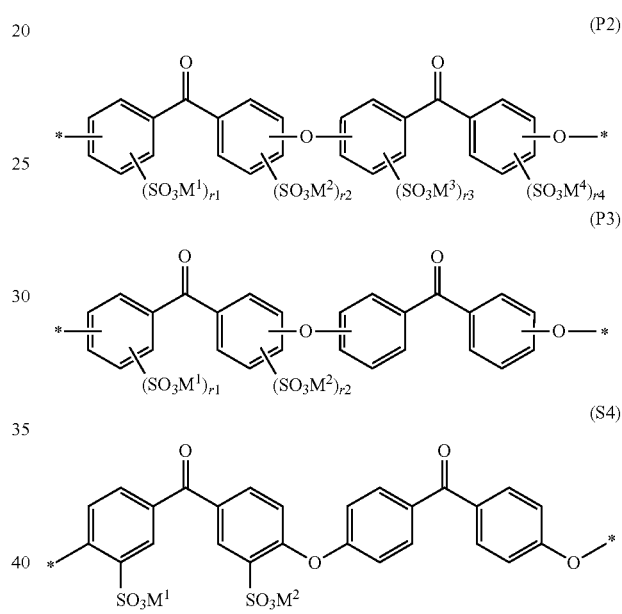

where, in the formulae (P2), (P3), and (S4), $M^1$ to $M^4$ are each hydrogen, metal cation, and ammonium cation; $M^1$ to $M^4$ can be two or more kinds of groups; r1 to r4 are each independently 0 to 2; r1+r2 signifies 1 to 8; and r1 to r4 may each be two or more kinds of values.

A preferable example of the constituent unit that is caused to be copolymerized other than the constituent unit represented by the general formula (S1), as the segment (A1) containing an ionic group, includes an aromatic polyether-based polymer containing a ketone group and containing an ionic group.

The synthesis method for the segment (A1) containing an ionic group, used in the present invention, is not specifically limited if only the method is a method in which substantially sufficient molecular weight is obtained. For example, the synthesis can be done through the utilization of: an aromatic nucleophilic substitution reaction of an aromatic active dihalide compound and a divalent phenol compound; or an aromatic nucleophilic substitution reaction of a halogenated aromatic phenol compound.

As an aromatic active dihalide compound used in the segment (A1) containing an ionic group, the use, as a monomer, of a compound in which an ionic acid group is introduced into an aromatic active dihalide compound is preferred from the viewpoint of chemical stability, manufacturing cost, and availability of precision control of the amount of ionic group. Preferred examples of the monomer having sulfonic acid group as the ionic group can include, 3,3'-disulfonate-4,4'-dichlorodiphenylsulfone, 3,3'-disulfonate-4,4'-difluorodiphenylsulfone, 3,3'-disulfonate-4,4'-dichlorodiphenylketone, 3,3'-disulfonate-4,4'-difluorodiphenylketone, 3,3'-disulfonate-4,4'-dichlorodiphenylphenylphosphine oxide, 3,3'-disulfonate-4,4'-difluorodiphenylphenylphosphine oxide and the like, but these are not limiting.

From the viewpoint of proton conductivity and hydrolysis resistance, sulfonic acid group is most preferred as the ionic group, but the monomer having an ionic group used in the present invention may contain other ionic group. Among these, from the viewpoint of chemical stability and physical durability, more preferable ones are 3,3'-disulfonate-4,4'-dichlorodiphenylketone and 3,3'-disulfonate-4,4'-difluorodiphenylketone, and from the viewpoint of polymerization activity, the most preferable one is 3,3'-disulfonate-4,4'-difluorodiphenylketone.

The segment (A1) containing an ionic group synthesized using 3,3'-disulfonate-4,4'-dichlorodiphenylketone and 3,3'-disulfonate-4,4'-difluorodiphenylketone as the monomer having an ionic group, further contains the constituent unit represented by the general formula (p1), and the segment (A1) is favorably used. The aromatic polyether-based polymer has the high crystallinity characteristics of ketone group, and is a component having superior hot water resistance to the sulfone group, thus serving as an effective component in the material excellent in dimensional stability, mechanical strength, and physical durability, under high-temperature and high-humidity conditions, thereby being further preferably used. In the polymerization, that type of sulfonic acid group preferably takes the form of a salt with monovalent cation species. The monovalent cation species may be sodium, potassium, other metal species, various kinds of amines or the like, and they are not specifically limited. These aromatic active dihalide compounds can be used alone, and can be used with a combination of a plurality of aromatic dihalide compounds.

[Chemical formula 10]

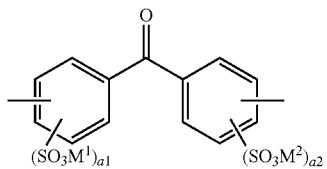

(p1)

where, in the general formula (p1), $M^1$ and $M^2$ are each hydrogen, metal cation, and ammonium cation; a1 and a2 are each an integer of 1 to 4; the constituent unit represented by the general formula (p1) may be arbitrarily substituted.

Furthermore, as to the aromatic active dihalide compound, the ionic group density can be controlled by copolymerization of the one containing an ionic group and the one not containing an ionic group. However, as to the segment (A1) containing an ionic group according to the present invention, the one not copolymerizing an aromatic active dihalide compound not containing an ionic group is more preferable from the viewpoint of securing continuity of the proton conduction pass.

Specific examples of more preferable aromatic active dihalide compound not containing an ionic group can include, 4,4'-dichlorodiphenyl sulfone, 4,4'-difluorodiphenyl sulfone, 4,4'-dichlorodiphenly ketone, 4,4'-difluorodiphenyl ketone, 4,4'-dichlorodiphenlyphenylphosphine oxide, 4,4'-difluorodiphenylphenylphosphine oxide, 2,6-dichlorobenzonitrile, 2,6-difluorobenzonitrile and the like. Among these, 4,4'-dichlorodiphenyl ketone and 4,4'-difluuorodiphenyl ketone are more preferable from the viewpoint of providing crystallinity, mechanical strength, physical durability, and hot water resistance, and furthermore, 4,4'-difluorodiphenyl ketone is most preferable from the viewpoint of polymerization activity. These aromatic active dihalide compounds can be used alone, and can also be used together with a plurality of aromatic active dihalide compounds.

The polymer electrolyte materials synthesized using 4,4'-dichlorodiphenyl ketone or 4,4'-difluorodiphenyl ketone as the aromatic active dihalide compound further contain the constitution moiety represented by the general formula (p2), and are preferably used. The constituent unit serves as a component that provides intermolecular cohesive force and crystallinity, thus serving as a material excellent in dimensional stability, mechanical strength, and physical durability under high-temperature and high-humidity conditions, and the constituent unit is preferably used.

[Chemical formula 11]

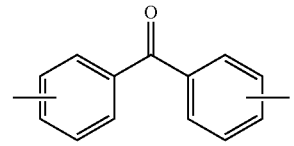

(p2)

where, the constituent unit represented by the general formula (p2) may be arbitrarily substituted, and does not contain an ionic group.

An example of the monomer not containing an ionic group, which can perform copolymerization, includes a halogenated aromatic hydroxy compound. Although the halogenated aromatic hydroxy compound is not specifically limited, there are included, as examples, 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-(4'-hydroxybiphenyl) (4-chlorophenyl) sulfone, 4-(4'-hydroxybiphenyl) (4-fluorophenyl) sulfone, 4-(4'-hydroxybiphenyl) (4-chlorophenyl) ketone, 4-(4'-hydroxybiphenyl) (4-fluorophenyl) ketone and the like. They can be used alone, and can be used as a mixture of two or more thereof. Furthermore, an aromatic polyether-based compound can be synthesized by causing these halogenated aromatic hydroxy compounds to react in the reaction between an activated dihalogenated aromatic compound and an aromatic dihydroxy compound.

As preferred examples of the constituent unit that is caused to be copolymerized other than the constituent unit represented by the general formula (S1), as the segment (A1) containing an ionic group, specifically preferable are aromatic polyether ketone-based polymer that includes the constituent unit represented by the general formulae (T1) and (T2) that comprises the constituent unit represented by the general formulae (p1) and (p2)

[Chemical formula 12]

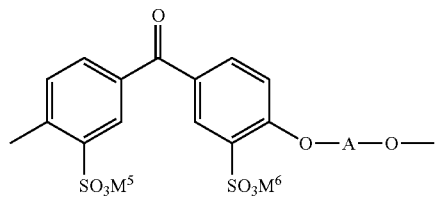
(T1)

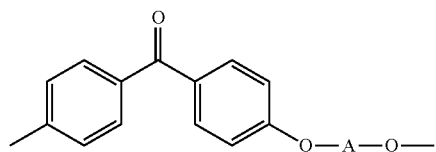
(T2)

where, in the general formulae (T1) and (T2), A is a divalent organic group containing aromatic ring; $M^5$ and $M^6$ are each hydrogen, metal cation, and ammonium cation; and A can be two or more kinds of groups.

By changing the composition ratio of the constituent units represented by the general formulae (T1) and (T2), the ion-exchange capacity can be controlled. When the quantities of constituent units represented by the general formulae (p1), (T1) and (T2) are expressed as p1, T1 and T2, respectively, the introduction quantity of p1 is, on the basis of the sum of moles of T1 and T2, preferably 75 mol % or larger, more preferably 90 mol % or larger, and most preferably 100 mol %. When the introduction quantity of p1 is smaller than 75 mol %, the formation of proton conduction pass becomes insufficient in some cases, which is not favorable.

Here, as the divalent organic group A containing aromatic ring in the general formulae (T1) and (T2), there can be used various kinds of divalent phenol compounds which can be used for polymerization of aromatic polyether-based polymer by the aromatic nucleophilic substitution reaction, but the divalent organic group A is not limited. In addition, these aromatic dihydroxy compounds to which further introduces sulfonic acid group can be used as the monomer.

Specific examples of preferred divalent organic group A containing aromatic ring are the groups represented by the general formulae (X'-1) to (X'-6), but they are not limited.

[Chemical formula 13]

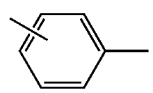
(X'-1)

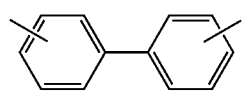
(X'-2)

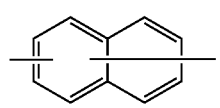
(X'-3)

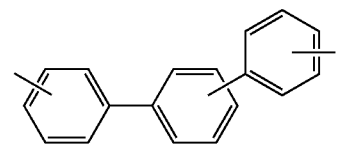
(X'-4)

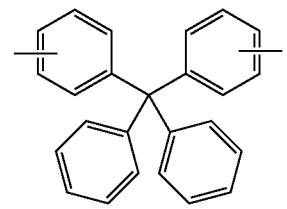
(X'-5)

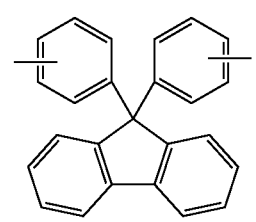
(X'-6)

where, the groups represented by the formulae (X'-1) to (X'-6) may be arbitrarily substituted.

They can contain an ionic group. The ones having aromatic ring at side chain are preferred specific examples. Two or more of them together are also used as necessary. Among these, more preferable groups are represented by the general formulae (X'-1) to (X'-4), and most preferable group is represented by the general formula (X'-2) or (X'-3) from the viewpoint of crystallinity, dimensional stability, toughness, and chemical stability.

The number-average molecular weights of the segment (A1) containing an ionic group and the segment (A2) not containing an ionic group are related to the domain size of the phase-separated structure, and from the viewpoint of balance between the proton conductivity and the physical durability under low-humidification conditions, the number-average molecular weights of the segment (A1) and the segment (A2) are preferably 5,000 or larger, more preferably 10,000 or larger, and most preferably 15,000 or larger. In addition, the number-average molecular weight thereeach is preferably 50,000 or smaller, more preferably 40,000 or smaller, and most preferably 30,000 or smaller.

The block copolymer according to the present invention is suitable for the polymer electrolyte materials, and is specifically used as the polymer electrolyte form articles. The "polymer electrolyte form article" referred to herein means a molded product containing the polymer electrolyte material of the present invention. The polymer electrolyte form article according to the present invention can take various shapes depending on the uses such as membrane (including film and film-like ones), plate, fiber, hollow fiber, particles, mass, fine pores, coating, and foam bodies. Because of the improvement in freedom of polymer design and the improvement in various characteristics such as mechanical characteristics and solvent resistance, the polymer electrolyte form article can be applied in wide range of uses. In particular, when the polymer electrolyte form article is membrane, the use is preferred.

In using the polymer electrolyte material according to the present invention as the polymer electrolyte fuel cell, the polymer electrolyte membrane and the electrode catalyst layer are suitable. Among these, the polymer electrolyte material is suitably used as the polymer electrolyte membrane. When using the polymer electrolyte material as the polymer electrolyte fuel cell, the material is normally used, in a membrane state, as the polymer electrolyte membrane and the binder of electrode catalyst layer.

The polymer electrolyte form article according to the present invention is applicable for various uses. The polymer electrolyte form article is applicable for medical uses such as extracorporeal circulation column and artificial skin, filtering use, ion-exchange resin use such as anti-chlorine reverse osmosis membrane, various structuring materials, electrochemical use, humidification membrane, antifogging membrane, antistatic membrane, solar cell membrane, and gas barrier material. In addition, the polymer electrolyte form article according to the present invention is also suitable for artificial muscle and actuator material. Among these, the molded product is more preferably used for various electrochemical uses. The electrochemical uses include fuel cell, redox flow battery, water electrolyzer, and chloroalkali electrolyzer, and the like. Among these, the fuel cell use is most preferable.

Next, the method of manufacturing the polymer electrolyte form article according to the present invention will be described specifically.

In the conventional block copolymer including a segment containing an ionic group, a segment not containing an ionic group, and a linker moiety connecting the segments, not only the segment containing an ionic group but also the segment not containing an ionic group is formed of an amorphous polymer having solubility because of the limitation of synthesis, in which solubility to solvent is required at the time of polymerization and membrane-formation. The amorphous segment not containing an ionic group has poor cohesive force of polymer molecule chains, and thus when being formed in a membrane state, the amorphous segment has poor toughness, and cannot suppress the swelling of the segment containing an ionic group, and thus was not able to achieve satisfactory mechanical strength and physical durability. In addition, from the problem of thermal decomposition temperature of the ionic group, normally, the cast molding is used, and thus the crystalline polymer having poor solubility was not able to obtain a homogeneous and tough membrane in the cast molding.

The polymer electrolyte form article according to the present invention includes a block copolymer having the segment (A2) not containing an ionic group comprising the constituent unit represented by the general formula (S2). Since the segment (A2) not containing an ionic group is a segment exhibiting crystallinity, it can be manufactured by the processes of: molding a precursor of the block copolymer to which a protective group is introduced at least into the segment (A2) not containing an ionic group; and then deprotecting at least a part of the protective group contained in the molded product. As to the block copolymer, processability tends to deteriorate owing to the crystallization of polymer forming the domain, in comparison with the processability of the random copolymer, and thus it is preferable to introduce the protective group at least into the segment (A2) not containing an ionic group and to improve the processability. Also into the segment (A1) containing an ionic group, the protective group is preferably introduced, when the processability becomes poor.

Specific examples of the protective group used in the present invention are the ones commonly used in organic synthesis, and the protective group is a substituent which is temporarily introduced on the premise of being removed in the subsequent step, which can protect highly reactive functional group to make the group inactive in the subsequent reaction, and which can perform deprotection after the reaction, to thereby return the protected group to the original functional group. That is, the protective group forms a pair with the functional group being protected. There are cases where, for example, t-butyl group is used as the protective group of hydroxyl group, but when the same t-butyl group is introduced into the alkylene chain, the t-butyl group is not referred to as "the protective group". The reaction introducing the protective group is referred to as "the protection (reaction)", and the reaction removing the protective group is referred to as "the deprotection (reaction)".

Such protective reactions are, for example, described in detail in Theodora W. Greene, "Protective Groups in Organic Synthesis", U.S., John Wiley & Sons, Inc. 1981, and they can be preferably used. The reactions are appropriately selected in consideration of reactivity and yield of protection reaction and deprotection reaction, stability in a state of containing the protective group, manufacturing cost, and the like. In addition, the stage of introducing the protective group in the polymerization reaction may be monomer stage, oligomer stage, or polymer stage.

Specific examples of the protection reactions include: the method of protecting/deprotecting the ketone moiety at the ketal moiety; and the method of protecting/deprotecting the ketone moiety at the ketal moiety by a hetero atom-analog such as thioketal. These methods will be described in Chapter 4 of the above literature "Protective Groups in Organic Synthesis". There are further included: the method of protection/deprotection between sulfonic acid and a soluble ester derivative; the method of protection/deprotection by introducing a t-butyl group as the soluble group into aromatic ring, and by removing the t-butyl group by an acid; and the like. However, these methods are not limited, and any protective group can be preferably used. From the viewpoint of enhancing solubility in common solvents, an aliphatic group, specifically an aliphatic group containing cyclic portion is preferably used as the protective group owing to the large steric hindrance.

More preferable protection reaction includes, from the viewpoint of reactivity and stability, the method of protection/deprotection of ketone moiety at the ketal moiety; and the method of protection/deprotection of ketone moiety at a hetero atom-analog of the ketal moiety, for example thioketal. In the polymer electrolyte material and the polymer electrolyte membrane according to the present invention, more preferable constituent unit containing protective group is the one containing at least one selected from the general formulae (U1) and (U2).

[Chemical formula 14]

where, in the formulae (U1) and (U2), $Ar_9$ to $Ar_{12}$ are each an arbitrary divalent arylene group; $R_1$ and $R_2$ are each at least one kind of group selected from H and alkyl group; $R_3$ is an arbitrary alkylene group; E is O or S, each may represent two or more kinds of groups; the group represented by the formulae (U1) and (U2) may be arbitrarily substituted; the symbol * signifies the bond moiety with the general formulae (U1) and (U2) or other constituent unit.

Among these, from the viewpoint of odor, reactivity, stability, and the like of the compound, the most preferable is that E is O in the general formulae (U1) and (U2), that is, the method of protection/deprotection of ketone moiety at the ketal moiety is the most preferable.

In the general formula (U1), $R_1$ and $R_2$ are more preferably alkyl group from the viewpoint of stability, further preferably alkyl group having 1 to 6 of carbons, and most preferably alkyl group having 1 to 3 carbons. In addition, in the general formula (U2), from the viewpoint of stability, $R_3$ is preferably alkylene group having 1 to 7 carbons, that is, a group represented by $C_{n1}H_{2n1}$ (n1 is an integer of 1 to 7), and most preferably alkylene group having 1 to 4 carbons. Examples of $R_3$ include, $—CH_2CH_2—$, $—CH(CH_3)CH_2—$, $—CH(CH_3)CH(CH_3)—$, $—C(CH_3)_2CH_2—$, $—C(CH_3)_2CH(CH_3)—$, $—C(CH_3)_2C(CH_2)_2—$, $—CH_2CH_2CH_2—$, and $—CH_2C(CH_3)_2CH_2—$, and these are not the limited ones. As to $R_3$, from the viewpoint of stability and easiness in synthesis, the most preferable is at least one selected from $—CH_2CH_2—$, $—CH(CH_3)CH_2—$, and $—CH_2CH_2CH_2—$.

Among the constituent units represented by the general formulae (U1) and (U2), from the viewpoint of stability such as hydrolysis resistance, the one having at least the general formula (U2) is preferably used.

In the general formulae (U1) and (U2), preferable organic groups as $Ar_9$ to $Ar_{12}$ are phenylene group, naphthylene group, and biphenylene group. These organic groups may be arbitrarily substituted. As the block copolymer according to the present invention, from the viewpoint of solubility and availability of raw material, both $Ar_{11}$ and $Ar_{12}$ in the general formula (U2) are preferably phenylene groups, and most preferably both of them are p-phenylene groups.

In the present invention, the method of performing protection of the ketone moiety by ketal includes the method of causing a precursor compound having ketone group to react with a mono-functional and/or bi-functional alcohol in the presence of an acid catalyst. For example, the manufacturing can be done by the reaction between 4,4'-dihydroxybenzophenone as the ketone precursor and mono-functional and/or bi-functional alcohol in a solvent of aliphatic or aromatic hydrocarbon in the presence of acid catalyst such as hydrogen bromide. The alcohol is an aliphatic alcohol having 1 to 20 carbons. An improvement method for manufacturing the ketal monomer used in the present invention is the reaction between 4,4'-dihydroxybenzophenone as the ketone precursor and bi-functional alcohol, in the presence of alkylorthoester and a solid catalyst.

In the present invention, the method of performing deprotection of at least a part of the ketone moiety protected by the ketal, to thereby set the part to the ketone moiety is not specifically limited. The deprotection reaction can be performed in the presence of water and acid under a homogeneous or heterogeneous condition, but from the viewpoint of mechanical strength, physical durability, and solvent resistance, the method of performing acid treatment after molding into membrane or the like is more preferable. Specifically, it is possible to deprotect the molded membrane by immersing it in an aqueous solution of hydrochloric acid or an aqueous solution of sulfuric acid. The concentration of acid and the temperature of aqueous solution can be adequately selected.

The weight ratio of the necessary acidic aqueous solution to the polymer is preferably in a range of 1 to 100 fold, and furthermore a large volume of water can be used. The acid catalyst is used preferably at a concentration of 0.1 to 50% by weight to the existing water. Preferred acid catalyst includes: strong mineral acid (strong inorganic acid) such as hydrochloric acid, nitric acid, fluorosulfonic acid, and sulfuric acid; and strong organic acid such as p-toluene sulfuric acid and trifluoromethane sulfuric acid. The quantity of acid catalyst and of excessive water, the reaction pressure, and the like can be adequately selected depending on the polymer membrane thickness and the like.

For example, with a membrane having a thickness of 25 μm, it is possible to readily deprotect nearly the total amount of the membrane by immersing the membrane in an acidic aqueous solution exemplified by aqueous solution of 6N hydrochloric acid and aqueous solution of 5% by weight of sulfuric acid, followed by heating the membrane for 1 to 48 hours at room temperature to 95° C. Furthermore, even when the membrane is immersed in an aqueous solution of 1N hydrochloric acid for 24 hours at 25° C., substantially all the protective groups can be deprotected. However, as the condition of deprotection, the above methods are not limited, and there can be performed deprotection by using acidic gas, organic acid, or heat treatment.

Specifically, for example, the precursor of the block copolymer containing the constituent unit represented by the general formulae (U1) and (U2) can be synthesized by using a compound represented by the general formulae (U1-1) and (U2-1) as the divalent phenol compound, and by using aromatic nucleophilic substitution reaction with an aromatic active dihalide compound. The constituent unit represented by the general formulae (U1) and (U2) may be derived from the divalent phenol compound or may be derived from the aromatic active dihalide compound. However, in consideration of the reactivity of the monomer, the use of a compound derived from a divalent phenol compound is more preferable.

[Chemical formula 15]

(U1-1)

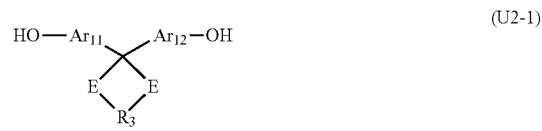

(U2-1)

where, in the general formulae (U1-1) and (U2-1), $Ar_9$ to $Ar_{12}$ are each an arbitrary a divalent arylene group; $R_1$ and $R_2$ are each at least one of H and alkyl group; $R_3$ is an arbitrary alkylene group; and E is O or S. The compound represented by the general formulae (U1-1) and (U2-1) may be arbitrarily substituted.

Specific examples of the specifically preferred divalent phenol compounds used in the present invention are compounds represented by the general formulae (r1) to (r10), and derivatives derived from these divalent phenol compounds.

[Chemical formula 16]

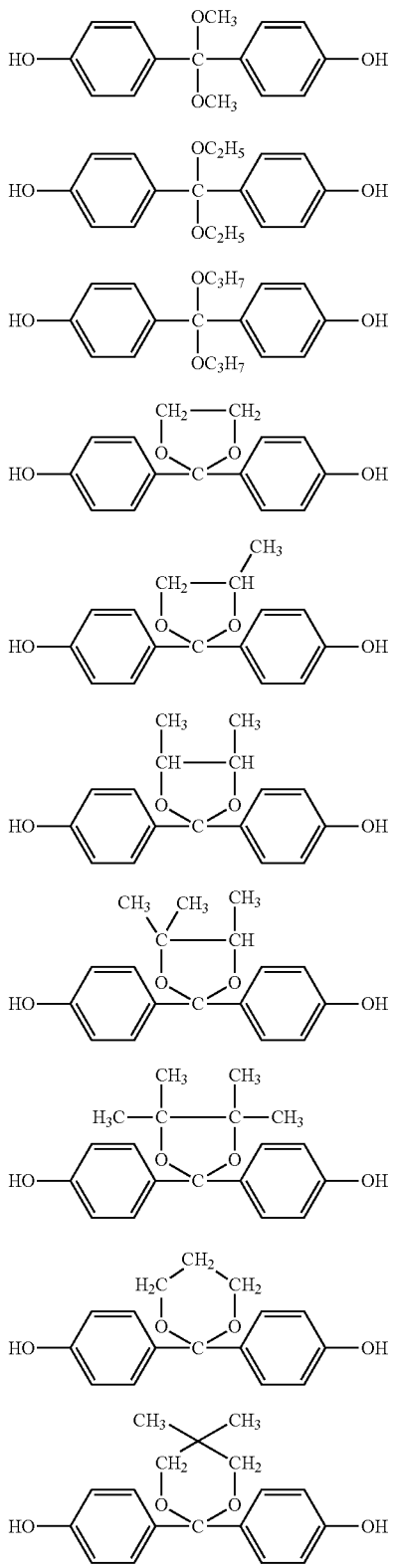

(r1)
(r2)
(r3)
(r4)
(r5)
(r6)
(r7)
(r8)
(r9)
(r10)

Among these divalent phenol compounds, from the viewpoint of stability, the compounds represented by the general formulae (r4) to (r10) are preferred, more preferably the compounds represented by the general formulae (r4), (r5), and (r9), and most preferably the compound represented by the general formula (r4).

In the synthesis of oligomer by the aromatic nucleophilic substitution reaction being conducted in order to obtain the segment to be used in the present invention, the oligomer can be obtained by the reaction of the above monomer mixture in the presence of a basic compound. The polymerization can be performed at temperatures ranging from 0° C. to 350° C., and the temperatures from 50° C. to 250° C. are preferred. When the temperature is lower than 0° C., the reaction tends not to proceed sufficiently, and when the temperature is higher than 350° C., the polymer decomposition tends to start occurring. Although the reaction can be done without solvent, it is preferable to conduct the reaction in a solvent. Applicable solvents include aprotic polar solvents, and the like such as N,N-dimethylacetoamide, N,N-dimethylformamide, N-methyl-2-pyrrolidone, dimethylsulfoxide, sulfolane, 1,3-dimethyl-2-imidazolidinone, and hexamethylsulfone triamide, but these solvents are not the limited ones, and any solvent can be applied if only the solvent can be used as a stable one in the aromatic nucleophilic substitution reaction. These organic solvents can be used alone or as a mixture of two or more thereof.

Examples of the basic compounds are sodium hydroxide, potassium hydroxide, sodium carbonate, potassium carbonate, sodium hydrogen carbonate, and potassium hydrogen carbonate, but they are not the limited ones, and any basic compound can be used as long as the compound can change the aromatic diols into the active phenoxide structure. In addition, in order to increase the nucleophilicity of the phenoxide, the addition of a crown ether such as 18-crown-6 is preferable. These crown ethers, in some cases, coordinate with sodium ions and potassium ions in the sulfonic acid group, to thereby improve the solubility in organic solvent, and can be favorably used.

In the aromatic nucleophilic substitution reaction, water is generated as a byproduct, in some cases. At this time, independent of the polymerization solvent, toluene or the like can be caused to coexist in the reaction system to remove the water from the system as an azeotrope. As the method of removing water from the reaction system, water-absorbent such as molecular sieve can be used.

The azeotropic agent to be used for removing reaction water or water introduced during the reaction is normally an arbitrary inactive compound which does not substantially interfere with the polymerization, which carries out co-distillation with water, and boils at temperatures ranging from about 25° C. to about 250° C. The normal azeotropic agent includes benzene, toluene, xylene, chlorobenzene, methylene chloride, dichlorobenzene, trichlorobenzene, cyclohexane and the like. Naturally, it is useful to select an azeotropic agent having lower boiling point than the boiling point of the bipolar solvent to be used. Although an azeotropic agent is normally used, the use of the azeotropic agent is not always required when the high reaction temperature, for example, 200° C. or higher is used, specifically when an inert gas is continuously sprayed onto the reaction mixture. Normally, the reaction is desirably conducted in a state where no oxygen exists in an inert atmosphere.

When the aromatic nucleophilic substitution reaction is conducted in a solvent, it is preferred to charge the monomer so that the concentration of polymer to be obtained is 5 to 50% by weight. When the concentration is smaller than 5% by weight, the degree of polymerization tends not to increase. On the other hand, when the concentration is larger than 50% by weight, the viscosity of reaction system becomes excessively high, which tends to result in difficulty in post-treatment of the reaction products.

After the completion of the polymerization reaction, the solvent is removed by vaporization from the reaction solution, and the desired polymer is obtained after rinsing the residue, as necessary. In addition, it is also possible to obtain the polymer by the processes of: adding the reaction solution to a solvent which has low polymer solubility and high solubility of by-product inorganic salt, to thereby remove the inorganic salt and to precipitate the polymer as solid; and filtering the sediment. The recovered polymer is rinsed by, as necessary, water, alcohol, or other solvents, followed by being dried. When the desired molecular weight is obtained, the halide or the phenoxide terminal group can be caused to react by introducing a phenoxide or a halide terminal-blocking agent which forms a stable terminal group, in some cases.

The molecular weight of thus obtained block copolymer according to the present invention is, as the weight-average molecular weight in terms of polystyrene, in a range of 1,000 to 5 million, preferably 10,000 to 500,000. When the molecular weight is smaller than 1,000, any of the mechanical strength including cracking, the physical durability, and the solvent resistance, of the molded membrane may be insufficient. On the other hand, when the molecular weight exceeds 5 million, there arise problems such as insufficient solubility and high solution viscosity, thereby resulting in poor processability, and the like.

Meanwhile, the chemical structure of the block copolymer according to the present invention can be confirmed by infrared absorption spectra: S=O absorption of 1,030 to 1,045 $cm^{-1}$ and 1,160 to 1,190 $cm^{-1}$; C—O—C absorption of 1,130 to 1,250 $cm^{-1}$; C=O absorption at 1,640 to 1,660 $cm^{-1}$ and the like, and these composition ratios can be determined by the neutralization titration of slufonic acid group and by the elemental analysis. In addition, nuclear magnetic resonance spectra ($^1$H-NMR) make it possible to confirm the structure by the peak of aromatic proton of 6.8 to 8.0 ppm, for example. Furthermore, the position of sulfonic acid group and the arrangement thereof can be confirmed by the solution $^{13}$C-NMR and the solid $^{13}$C-NMR.

Next, there will be exemplified a specific synthesis method of the block copolymer comprising each one or more of: the segment (A1) containing an ionic group; the segment (A2) not containing an ionic group; and the linker moiety connecting the segments. However, the present invention is not limited by the examples.

The block copolymer according to the present invention can be manufactured by the processes of: synthesizing the precursor of the block copolymer; and then deprotecting at least a part of the protective group contained in the precursor.

Examples of the method of manufacturing the block copolymer and the precursor of the block copolymer according to the present invention are as follows:

Method a: the method of manufacturing the block copolymer by the processes of: causing a dihalide linker to react with any of the segment represented by the general formula (S1) having —OM group at both ends thereof and/or the segment precursor, and the segment represented by the general formula (S2) having —OM group at both ends thereof and/or the segment precursor; and then conducting polymerization alternately with another segment.

Method b: the method of manufacturing the block copolymer by the process of randomly polymerizing, with the dihalide linker, the segment represented by the general formula (S1) having —OM group at both ends thereof and/or the segment precursor and the segment represented by the general formula (S2) having —OM group at both ends thereof and/or the segment precursor.

Method c: the method including the processes of: manufacturing the block copolymer by the Method a or the Method b through the use of a non-sulfonated compound of the segment represented by the general formula (S1) and/or the segment precursor; and then introducing selectively an ionic group into the non-sulfonated portion of the segment represented by the general formula (S1) and/or the segment precursor.

Method d: The method of combination of the above method a to c.

In the present invention, O of —OM group is oxygen, and M is H, metal cation, and ammonium cation. In the case of the metal cation, the valence number and the like are not specifically limited in use. Specific examples of preferred metal cations include Li, Na, K, Rh, Mg, Ca, Sr, Ti, Al, Fe, Pt, Rh, Ru, Ir, and Pd. Among these, Na, K, and Li are more preferable. As the —OM group, examples are hydroxyl group (—OH group), —O$^-$NR$_4^+$ group (R is H or an organic group), —ONa group, —OK group, and —OLi group.

Above all, the Method a is most preferred from the viewpoint that alternating copolymerization makes it possible to control the phase-separated domain size and to manufacture a chemically stable block copolymer.

That is, it is preferable that the method of manufacturing the block copolymer according to the present invention preferably includes at least the processes (1) and (2) described below. By including these processes, there can be achieved the enhancement of mechanical strength and durability due to the increase in the molecular weight, and by alternate introduction of both segments, there can be obtained the block copolymer having precise control of phase-separated structure and domain size and being excellent in proton conductivity at low-humidification conditions.

(1) The process of introducing a linker moiety through a reaction between a linker compound and —OM group at both terminals of a segment (A1) or a segment (A2):the segment (A1) comprising a constituent unit represented by the general formula (S1) and/or a constituent unit serving as a precursor of the constituent unit represented by the general formula (S1), and having —OM group (M is a hydrogen atom, a metal cation, or an ammonium cation) at both ends thereof, and further containing an ionic group; the segment (A2) comprising a constituent unit represented by the general formula (S2) and/or a constituent unit serving as a precursor of the constituent unit represented by the general formula (S2), and having —OM group at both ends thereof, and further not containing an ionic group, (2) The process of manufacturing a block copolymer or a precursor of the block copolymer through polymerization of linker moieties at both ends of the segment, to which the linker moiety synthesized in the process (1) is introduced, with the —OM groups at both ends of another segment.

Next, there will be described the linker moiety connecting the segments, and the linker compound as the raw material thereof, to be used in the present invention. The term "linker compound" referred to in the present invention means a dihalide compound or a multihalide compound, which serves as the linker moiety after the reaction.

The linker moiety connecting the segments used for the block copolymer according to the present invention is not specifically limited if only the linker moiety has high reactivity and can perform block copolymerization without cutting the segment, and specific examples of preferred linker moiety include octafluorobiphenylene (—C₆F₄—C₆F₄—), tetrafluorophenylene (—C₆F₄—), and any of the general formulae (L1) to (L7).

[Chemical formula 17]

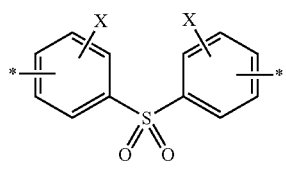
(L1)

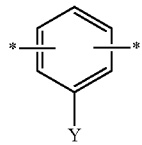
(L2)

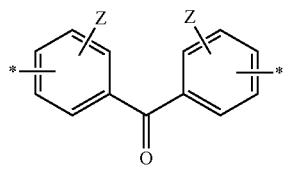
(L3)

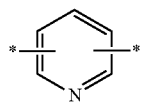
(L4)

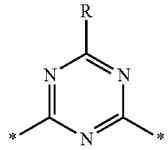
(L5)

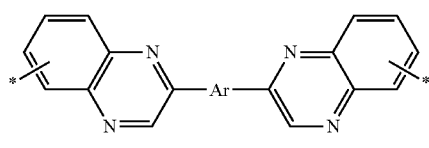
(L6)

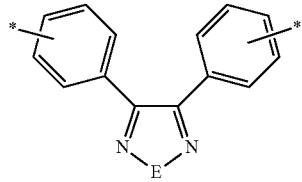
(L7)

where, in the general formula (L1), X is an electron-withdrawing group selected from the group consisting of H, NO₂, CN, CF₃, Cl, Br, and I; in the general formula (L2), Y is an electron-withdrawing group selected from the group consisting of NO₂, CN, CF₃, Cl, Br, and I; in the general formula (L3), Z is an electron-withdrawing group selected from the group consisting of NO₂, CN, CF₃, Cl, Br, and I; in the general formula (L5), R is an arbitrary organic group; in the general formula (L6), Ar is an arbitrary arylene group; in the general formula (L7), E is oxygen or sulfur. The general formulae (L1) to (L7) may each further be substituted by an electron-withdrawing group, and in the general formula (L1) to (L7), two or more kinds of X to Z, R, Ar, and E may be used independently of each other. The symbol * signifies the bond moiety of the general formulae (L1) to (L7) with other segment.

The linker compound used for polymerizing the block copolymer according to the present invention is not specifically limited if only the linker compound is a highly reactive compound that can connect different segments while suppressing randomization and segment-cutting by the ether-exchange reaction, and specific examples of preferred linker compound can include at least one selected from the group consisting of decafluorobiphenyl, hexafluorobenzene, and the general formulae (M1) to (M7),

[Chemical formula 18]

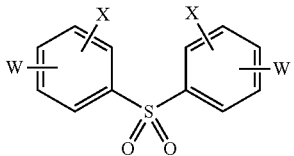
(M1)

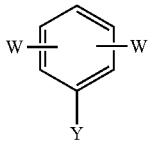
(M2)

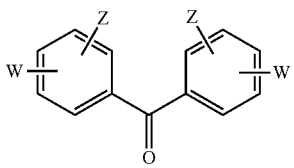
(M3)

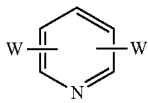
(M4)

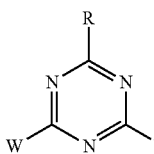
(M5)

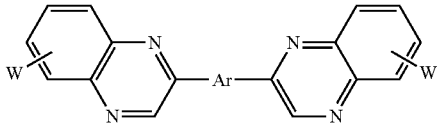
(M6)

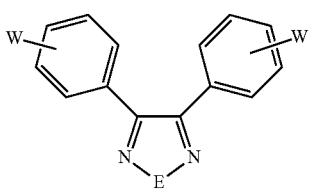
(M7)

where: in the general formulae (M1) to (M7), W is Cl or F; in the general formula (M1), X is an electron-withdrawing group selected from the group consisting of H, NO₂, CN, CF₃, Cl, Br, and I; in the general formula (M2), Y is an electron-withdrawing group selected from the group consisting of NO₂, CN, CF₃, Cl, Br, and I; in the general formula (M3), Z is an electron-withdrawing group selected from the group consisting of NO₂, CN, CF₃, Cl, Br, and I; in the general formula (M5), R is an arbitrary organic group; in the general formula (M6), Ar is an arbitrary arylene group; in the general formula (M7), E is oxygen or sulfur. The general formulae (M1) to (M7) may each further be substituted by an electron-withdrawing group, and in the general formulae (M1) to (M7), two or more kinds of X to Z, R, Ar, and E may be used independently of each other.

The block copolymer according to the present invention, through the use of a linker compound having high reactivity and being capable of performing block copolymerization without cutting the segment, allows strict control of the phase-separated structure of the block copolymer, to thereby realize excellent proton conductivity under low-humidification conditions. For example, when a multifunctional multi-halide linker such as decafluorobiphenyl or hexafluorobenzene is used, the block copolymer having a branched structure can be manufactured by controlling the reaction condition. In this case, by modifying the charge composition of the polymer having a non-sulfonated segment of the formula (S1) and the polymer having a segment of the formula (S2), the block copolymer having a straight chain structure and the block copolymer having a branched structure can be manufactured separately.

In addition, when the general formulae (M1) to (M7) are used, cross-linking reaction and branching reaction do not proceed, and thus the membrane-forming ability is good, the intermolecular interaction is strong, which makes it possible to realize toughness and physical durability at the same time. Furthermore, since the block copolymer according to the present invention in a polyether ketone-based in which the main chain skeleton has a ketone group of relatively a weak electron-withdrawing group, the liker compound represented by the general formulae (M1) to (M7), having the sulfone group giving stronger electron-withdrawing ability than that of the ketone group, and having an electron-withdrawing group at ortho position, can be used as the linker compound having higher reactivity than the main chain.

Examples of preferred linker compound are decafluorobiphenyl, hexafluorobenzene, diphenylsulfone-based linker compound represented by the formulae (M1-1) to (M1-8), benzonitrile-based linker compound represented by the formulae (M2-1) to (M2-12), nitrobenzene-based linker compound represented by the formulae (M3-1) to (M3-12), trifluoromethylbenzene-based linker compound represented by the formulae (M4-1) to (M4-12), benzophenone-based linker compound represented by the formulae (M5-1) to (M5-6), and compounds represented by the formulae (M6-1) to (M9-4). The linker compounds used in the present invention are not specifically limited to these ones, and their position-isomers and the ones having different pluralities of electron-withdrawing groups are also preferred examples.

[Chemical formula 19]

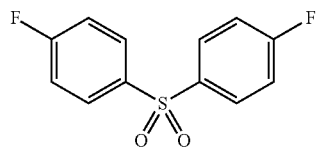
(M1-1)

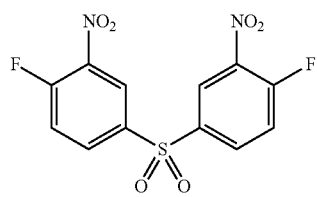
(M1-2)

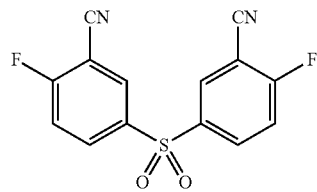
(M1-3)

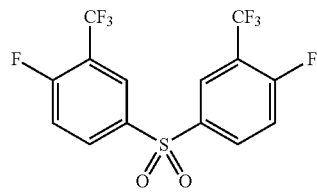
(M1-4)

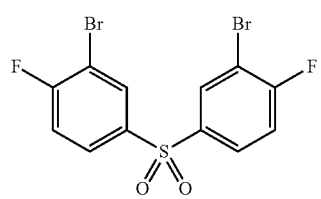
(M1-5)

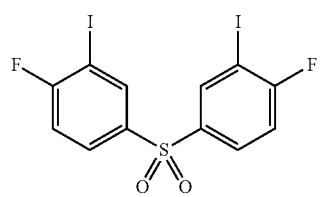
(M1-6)

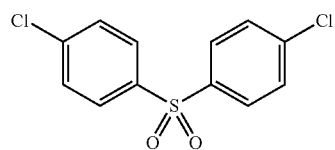
(M1-7)

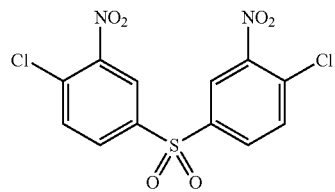
(M1-8)

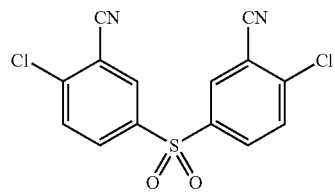
(M1-9)

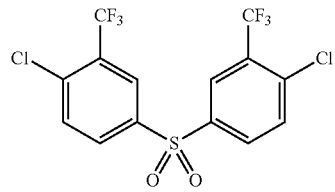
(M1-10)

-continued
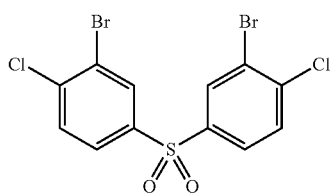 (M1-11)
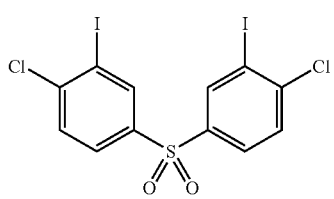 (M1-12)
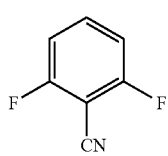 (M2-1)
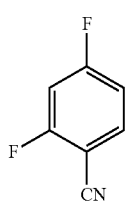 (M2-2)
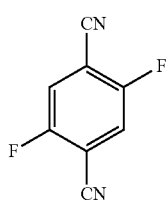 (M2-3)
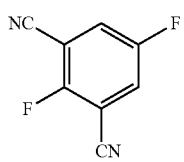 (M2-4)
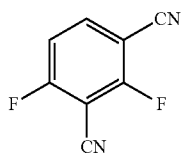 (M2-5)
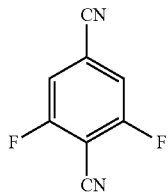 (M2-6)
-continued
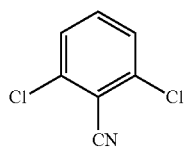 (M2-7)
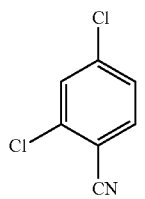 (M2-8)
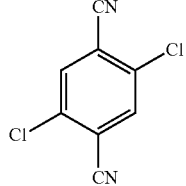 (M2-9)
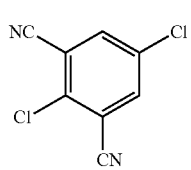 (M2-10)
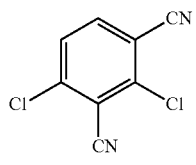 (M2-11)
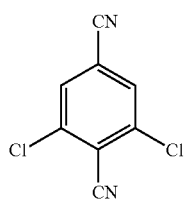 (M2-12)
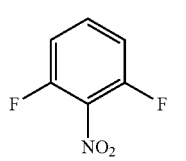 (M3-1)
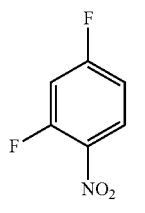 (M3-2)
(M3-3)

(M3-4), (M3-5), (M3-6), (M3-7), (M3-8), (M3-9), (M3-10), (M3-11), (M3-12), (M4-1), (M4-2), (M4-3), (M4-4), (M4-5), (M4-6), (M4-7)

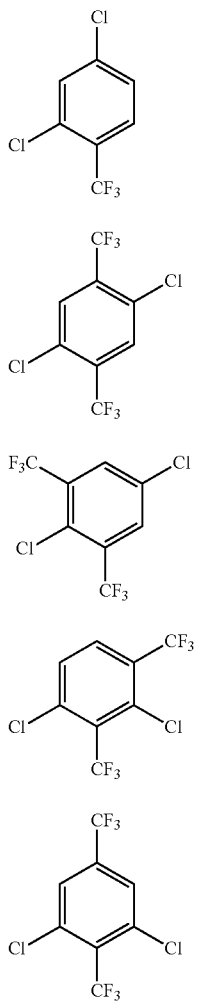
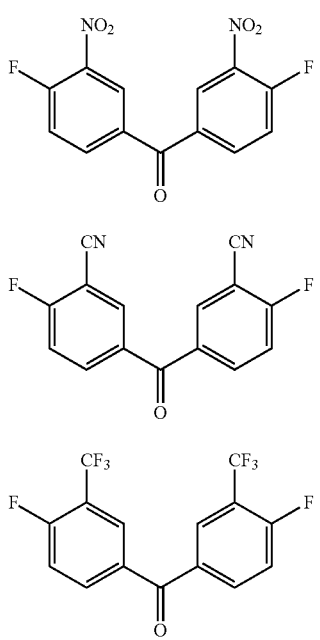
(M4-8)
(M4-9)
(M4-10)
(M4-11)
(M4-12)
(M5-1)
(M5-2)
(M5-3)
(M5-4)
(M5-5)
(M5-6)
(M6-1)
(M6-2)
(M7-1)
(M7-2)
(M8-1)
(M8-2)
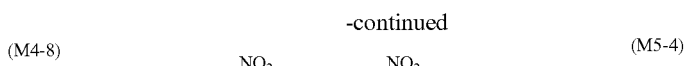
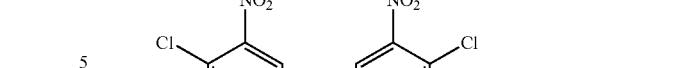
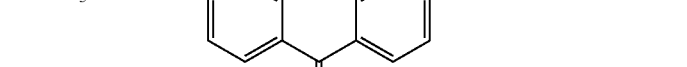
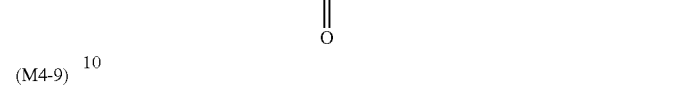
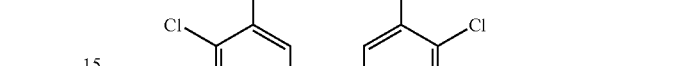
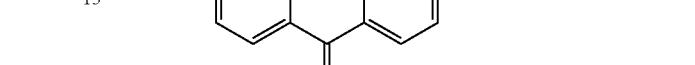
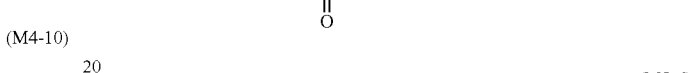
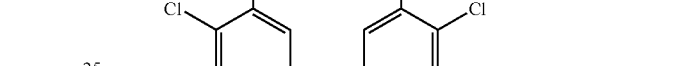
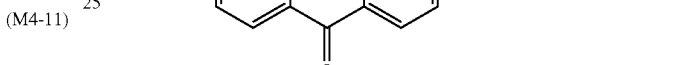
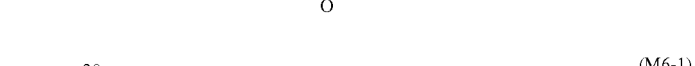
[Chemical formula 20]

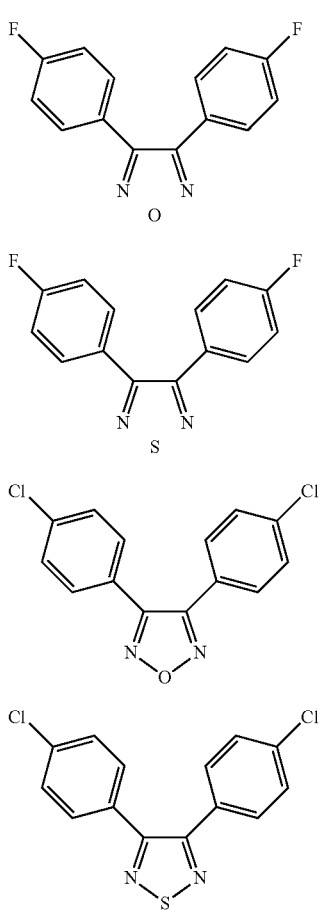

Among these compounds, decafluorobiphenyl and hexafluorobenzene are more preferable from the viewpoint of reactivity, molecular weight increase, and introduction of cross-linking or branching structure.

From the viewpoint of raw material cost, there are preferable diphenylsulfone-based linker compound represented by the formulae (M1-1) to (M1-8), benzonitrile-based linker compound represented by the formulae (M2-1) to (M2-12), and benzophenone-based linker compound represented by the formulae (M5-1) to (M5-6), more preferably diphenylsulfone-based linker compound represented by the formulae (M1-1) to (M1-8), and benzonitrile-based linker compound represented by the formulae (M2-1) to (M2-12). From the viewpoint of reactivity, there are preferable compounds to which nitro group, cyano group, bromo group, iodine group, and methoxy group as the electron-withdrawing group are introduced into the side chain: represented by (M1-2), (M1-3), (M1-5), (M1-6), (M1-8), (M1-9), (M1-11), (M1-12), (M2-1) to (M2-12), (M3-1) to (M3-12), (M5-1), (M5-2), (M5-4), (M5-5), (M7-1), and (M7-2). From the viewpoint of less side reactions, there are preferred the compounds introducing nitro group, cyano group, and methoxy group: represented by (M1-2), (M1-3), (M1-8), (M1-9), (M2-1) to (M2-12), (M3-1) to (M3-12), (M5-1), (M5-2), (M5-4), (M5-5), (M7-1), and (M7-2). From the viewpoint of raw material cost, there are preferred the compounds introducing nitro group: (M1-2), (M1-8), (M3-1) to (M3-12), (M5-1), and (M5-4).

Among these, from the viewpoint of balance of raw material cost, reactivity, and stability, preferred compounds are decafluorobiphenyl, hexafluorobenzene, and the compounds represented by the formulae (M1-1), (M1-2), (M1-6), (M2-1), (M2-2), (M2-3), (M5-1), (M5-4), and (M7-2), further preferred ones are decafluorobiphenyl, hexafluorobenzene, and the compounds represented by the formulae (M1-1), (M1-2), (M1-6), (M2-1), and (M5-1), and most preferable ones are decafluorobiphenyl, hexafluorobenzene, 4,4'-difluorodiphenylsulfone (M-1), and 2,6-difluorobenzonitrile (M2-1).

In the Method a, examples of the segment represented by the formula (S1) having —OM group at both ends thereof and the segment represented by the formula (S2) having —OM group at both ends thereof are the formulae (H3-1) and (H3-2), respectively. Examples of these segments prepared by the reaction with dihalide linker are the formulae (H3-3) and (H3-4), respectively. The present invention, however, is not limited by these examples.

[Chemical formula 21]

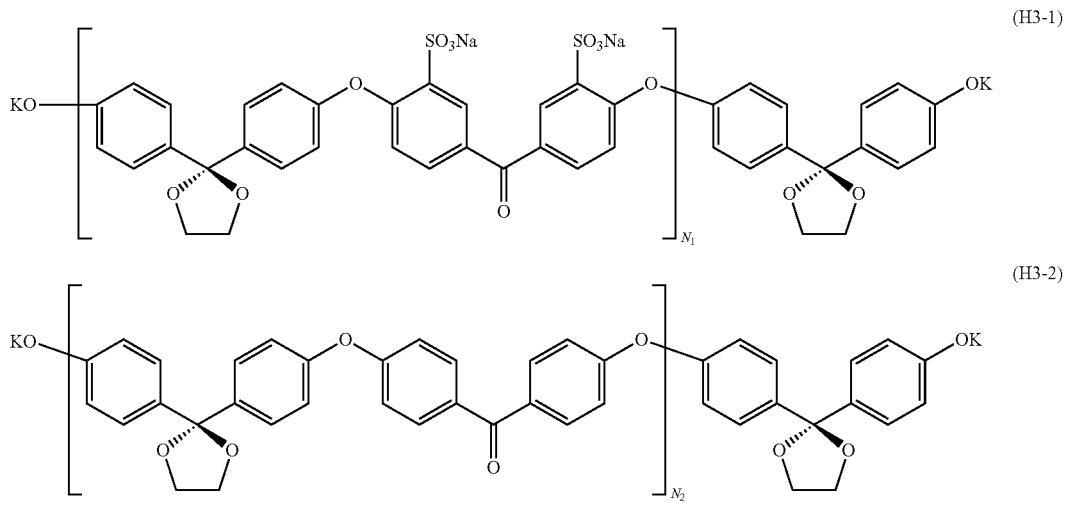

-continued

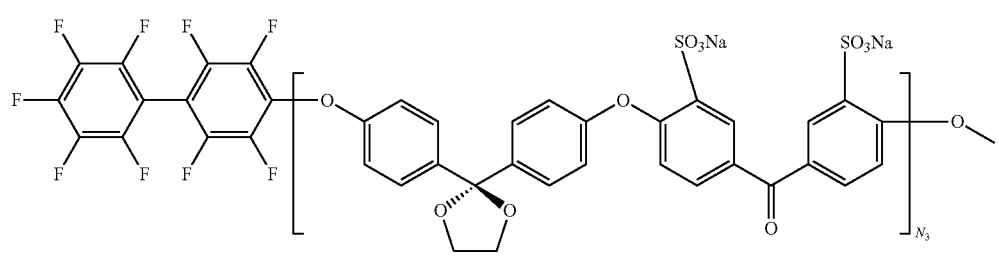

(H3-3)

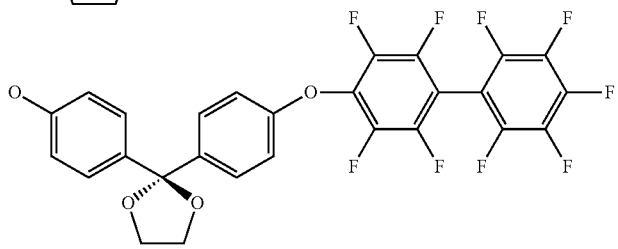

(H3-4)

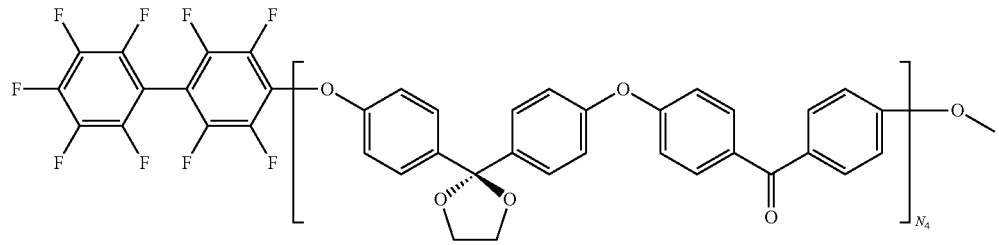

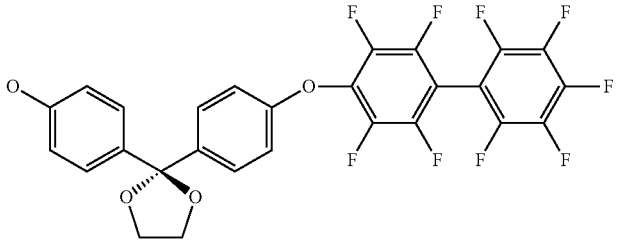

where, in the formulae (H3-1) to (H3-4), $N_1$, $N_2$, $N_3$, and $N_4$ are each independently an integer of 1 to 150.

In the formulae (H3-1) to (H3-4), halogen atom is expressed by F, terminal —OM group is expressed by —OK group, and alkali metal is expressed by Na and K. However, they are not the limited ones. The above formulae are given to help understanding of readers, and they are not necessarily give strict chemical structure, accurate composition, arrangement, position of sulfonic acid group, number, molecular weight, and the like of the polymerization components of the polymer, and they are not the limited ones.

Furthermore, for any of the segments in the formulae (H3-1) to (H3-4), ketal group is introduced as the protective group. According to the present invention, however, the protective group is requested to introduce into a component having high crystallinity and low solubility. Thus the segment (A1) containing an ionic group represented by the formulae (H3-1) and (H3-3) not necessarily requires the protective group, and from the viewpoint of durability and dimensional stability, the one without protective group is also preferably used.

The block given in an example of the formula (H3-1) can synthesize an oligomer with controlled molecular weight through the reaction between a bisphenol ingredient and an aromatic dihalide ingredient by a ratio of $(N_1+1)$ to $N_1$. The formula (H3-2) is the same to above.

The reaction temperature of block copolymerization using linker is preferably 140° C. or lower heating condition, and more preferably 80° C. or higher and 120° C. or lower. By bringing the reaction temperature to 120° C. or lower, the randomization of polymer structure by the ether-exchange in the reaction can be sufficiently suppressed. On the other hand, if the reaction temperature becomes 80° C. or higher, there can be obtained a polymer having a random polymer structure.

The block copolymer according to the present invention can be observed in co-continuous phase-separated structure using a transmission electron microscope. By controlling the phase-separated structure of the block copolymer, or the aggregation state and the shape of the segment (A1) containing an ionic group and the segment (A2) not containing anionic group, excellent proton conductivity is attained even under low-humidification conditions. The phase-separated structure can be analyzed by transmission electron microscope (TEM), atomic force microscope (AFM), and the like.

Preferred block copolymer of the present invention is the one allowing observing the phase-separated structure by TEM at 50,000 magnification, and giving 8 nm or larger and 100 nm or smaller average interlayer distance or average interparticle distance determined by image-processing. More preferable one is to give 10 nm or larger and 50 nm or smaller average interlayer distance or average interparticle distance, and most preferable one is to give 15 nm or larger and 30 nm or smaller thereof. If TEM cannot observe the phase-separated structure, or if the average interlayer distance or the average interparticle distance is smaller than 8 nm, the continuity of ion channel is insufficient to give insufficient conductivity, in some cases, which is unfavorable. If the interlayer distance exceeds 5,000 nm, the mechanical strength and the dimensional stability become poor, in some cases, which is unfavorable.

The block copolymer according to the present invention is characterized in having crystallinity while keeping a phase-separated structure, exhibiting the crystallinity by the differential scanning calorimetry (DSC) or by the wide angle X-ray diffractometry. That is, the block copolymer shows the crystallization heat of 0.1 J/g or larger determined by DSC, or shows the degree of crystallinity of 0.5% or larger determined by the wide angle X-ray diffraction.

The term "having crystallinity" referred to herein means that the polymer can be crystallized when heated, has a crystalline property, or has already been crystallized. The term "amorphous polymer" referred to herein means a polymer which is not a crystalline polymer and which does not substantially progress the crystallization. Accordingly, even for a crystalline polymer, if the polymer does not sufficiently progress the crystallization, the polymer is in an amorphous state, in some cases.

The method of molding the polymer electrolyte material of the present invention into a polymer electrolyte membrane is not specifically limited, and there can be applied a method of membrane-forming in a solution state or in a molten state at the stage having the protective group such as ketal. In the former case, there is a proposed method of forming the membrane by dissolving the polymer electrolyte material in a solvent such as N-methyl-2-pyrrolidone, and flow-expanding the solution for coating a glass plate or the like, followed by removing the solvent.

Applicable solvent for the membrane-forming is the one to dissolve the polymer electrolyte material and then to allow removing thereof. Examples of the solvent are: aprotic polar solvent such as N,N-dimethylacetoamide, N,N-dimethylformamide, N-methyl-2-pyrrolidone, dimethylsulfoxide, sulfolane, 1,3-dimethyl-2-imidazolidinone, and hexamethylphosphone triamide; ester-based solvent such as γ-butylolactone and butylacetate; carbonate-based solvent such as ethylene carbonate and propylene carbonate; alkylene glycol monoalkylether such as ethyleneglycol monomethylether, ethyleneglycol monoethylether, propyleneglycol monomethylether, and propyleneglycol monoethylether; alcohol-based solvent such as isopropanol; water; and a mixture thereof. Among these, aprotic polar solvent is preferred owing to the highest solubility. To increase the solubility of the segment (A1) containing an ionic group, addition of crown ether such as 18-crown-6 is preferred.

In addition, in the present invention, when the solution membrane-formation is performed using the block copolymer, the selection of solvent is important for the phase-separated structure, and a mixed use of the aprotic polar solvent with a solvent having low polarity is also a preferable method.

In order to obtain tough membrane, a preferred method is to subject the polymer solution prepared to give a necessary solid concentration, to normal pressure filtration or positive pressure filtration, and to thereby remove a foreign substance from the polymer electrolyte solution. Although the filter medium used herein is not specifically limited, glass filter and metallic filter are preferable. For the filtration, the minimum filter pore size allowing the polymer solution to pass therethrough is preferably 1 µm or smaller. Unless the filtration is performed, inclusion of a foreign substance occurs, which is unfavorable because membrane breakage occurs and durability become insufficient.

Thus obtained polymer electrolyte membrane is preferably subjected to heat treatment in a state where at least a part of the ionic groups is a metal salt. When the polymer electrolyte material used is polymerized in a metal salt state, it is preferable to form the membrane and to perform the heat treatment in that condition. The metal of the metallic salt is the one capable of forming a salt with a sulfonic acid, and from the viewpoint of price and environmental load, the preferred metal includes Li, Na, K, Rb, Cs, Mg, Ca, Sr, Ba, Ti, V, Mn, Fe, Co, Ni, Cu, Zn, Zr, Mo, and W. Among these, more preferable ones are Li, Na, K, Ca, Sr, and Ba, and further more preferable ones are Li, Na, and K.

The heat treatment temperature is preferably in a range of 80° C. to 350° C., more preferably 100° C. to 200° C., and particularly preferably 120° C. to 150° C. The heat treatment time is preferably 10 seconds to 12 hours, more preferably 30 seconds to 6 hours, and particularly preferably 1 minute to 1 hour. When the heat treatment temperature is excessively low, the mechanical strength and physical durability become insufficient in some cases. On the other hand, when the heat treatment temperature is excessively high, the chemical decomposition of the membrane material proceeds in some cases. When the heat treatment time is shorter than 10 seconds, the effect of heat treatment becomes insufficient. In contrast, when the heat treatment time exceeds 12 hours, the membrane material tends to deteriorate. The polymer electrolyte membrane obtained by the heat treatment can be proton-substituted by immersion into an acidic aqueous solution, as necessary. The polymer electrolyte membrane of the present invention makes it possible to simultaneously achieve a better balance of proton conductivity and physical durability by molding in this way.

The method of converting the polymer electrolyte material of the present invention into a membrane is performed by the processes of: forming the membrane constituted by the polymer electrolyte material by the above method; and then deprotecting at least a part of the ketone moiety being protected by ketal, to thereby obtain the ketone moiety. According to the method, it is possible to perform solution membrane-formation of the block copolymer comprising the segment not containing an ionic group which is poor in solubility, and to thereby simultaneously achieve the proton conductivity, mechanical strength, and physical durability.

The thickness of the polymer electrolyte membrane according to the present invention is used preferably in a range of 1 to 2,000 µm. In order to attain practical-use level of mechanical strength and physical durability of the membrane, the thickness is preferably larger than 1 µm. In order to decrease the membrane resistance, or to improve the power generation performance, the thickness is preferably smaller than 2,000 µm. More preferred membrane thickness range is from 3 to 50 µm, particularly preferable range is from 10 to 30 µm. That membrane thickness can be controlled by the solution concentration or by the coating thickness on the substrate.

In addition, to the polymer electrolyte membrane obtained in the present invention, there can be added additives such as crystallization nucleating agent, plasticizer, stabilizer, antioxidant, mold-releasing agent and the like, used for ordinary polymer compounds, within a range not inversely affecting the object of the present invention.

Furthermore, to the polymer electrolyte membrane obtained in the present invention, there can be added various polymers, elastomers, fillers, fine particles, various additives, and the like, within a range not inversely affecting the above characteristics, in order to enhance the mechanical strength, heat stability, processability and the like. In addition, the polymer electrolyte membrane may be reinforced with fine porous film, nonwoven cloth, mesh, and the like.

The method of joining the polymer electrolyte membrane with the electrode on using the polymer electrolyte membrane as fuel cell is not specifically limited, and known methods can be applied; for example, "Chemical Plating Methods", J. Electrochem. Soc., 1985, 53, p. 269, (Electrochemical Society of Japan), and "Hot press joining of gas-diffusion electrode", Electrochemical Science and Technology, 1988, 135, 9, p. 2209.

The polymer electrolyte fuel cell makes use of a hydrogen ion-conductive polymer electrolyte membrane as the electrolyte membrane, and has a structure of laminating a catalyst layer, an electrode substrate, and a separator, alternately, on both sides of the membrane. Among these, the one in which the catalyst layer is laminated on both sides of the electrolyte membrane, (that is, the layer structure of catalyst layer/electrolyte membrane/catalyst layer) is called "the catalyst-coated electrolyte membrane (CCM)", and the one in which the catalyst layer and the gas-diffusion substrate are alternately laminated on both sides of the electrolyte membrane (that is, the laminated structure of gas-diffusion substrate/catalyst layer/electrolyte membrane/catalyst layer/gas-diffusion substrate) is called the "electrode-electrolyte membrane joined assembly (MEA)".

A common method of manufacturing the catalyst layer-coated electrolyte membrane is the coating method of coating and drying a catalyst layer paste composition for forming the catalyst layer on the surface of the electrolyte membrane. However, this coating method causes swelling and deformation of the electrolyte membrane caused by the solvent such as water or alcohol, thus raising a problem of difficulty in forming the desired catalyst layer on the surface of the electrolyte membrane. Furthermore, in the drying process, the electrolyte membrane is also exposed to high temperature atmosphere, thereby resulting in raising a problem of thermal expansion or the like and deformation. In order to solve the problem, there is proposed a method of stacking the catalyst layer on the electrolyte membrane (transfer method), in which only the catalyst layer is formed on the substrate in advance, and then the catalyst layer is transferred on the electrolyte membrane (for example, Japanese Patent Laid-Open No. 2009-9910).

The polymer electrolyte membrane obtained in the present invention has toughness and has excellent solvent resistance owing to its crystallinity, and thus can specifically be preferably used also as the catalyst layer-coated electrolyte membrane by any of the coating method and the transfer method.

When MEA is fabricated by hot press, the temperature and the pressure may be adequately selected depending on the thickness of electrolyte membrane, the water content, the catalyst layer, and the electrode substrate. According to the present invention, press-composite can be applied even when the electrolyte membrane is in a dry state or in a state of absorbing water. Specific press method includes roll press specifying pressure and clearance, flat press specifying pressure and the like, and from the viewpoint of industrial productivity and suppression of thermal decomposition of polymer material containing an ionic group, the press is preferably performed in a temperature range of 0° C. to 250° C. From the viewpoint of protection of electrolyte membrane and of electrode, the press is preferably performed under lower pressure as much as possible, and in the case of flat press, 10 MPa or smaller pressure is preferred. A preferred selectable method is, from the viewpoint of prevention of short-circuit of anode and cathode electrodes, to join the electrode and the electrolyte membrane to thereby form the fuel cell without applying composite-formation by the hot press process. With that method, when power generation is repeated as the fuel cell, the deterioration of electrolyte membrane presumably originated from the short-circuit position tends to be suppressed, which improves the durability of fuel cell.

Furthermore, the intended uses of the polymer electrolyte fuel cell using the polymer electrolyte material and the polymer electrolyte membrane according to the present invention are not specifically limited, but power supply source to mobile body is a preferred one. In particular, preferred uses are substitution of conventional primary cell or rechargeable cell, or hybrid power sources therewith, and include: handy equipment such as cell phone, personal computer, PDA, TV, radio, music player, game player, head set, and DVD player; various robots of human type and animal type for industrial use; household electric appliances such as cordless vacuum cleaner; toys; power source of mobile body such as motor bicycle, motorbike, automobile, bus, truck, ship, and railway; and stationary power generator.

DESCRIPTION OF EMBODIMENTS

Hereinafter, the present invention will be described in more detail referring to examples, but the present invention is not limited by these examples. The conditions for measuring the physical properties are as follows. In addition, although, in the examples, chemical structural formulae are inserted, they are inserted in order to help the understanding of readers, and they are not the limited ones.

(1) Ion-Exchange Capacity

The ion-exchange capacity was measured by neutralization titration. The measurements were performed three times, and then the average of them was taken.

(i) There was wiped off the moisture on the surface of the electrolyte membrane on which proton substitution was performed and which was fully rinsed by pure water, and then the membrane was dried in vacuum for 12 hours or more at 100° C. After that, the dry weight of the membrane was obtained.

(ii) To the electrolyte, there was added 50 mL of aqueous solution of 5% by weight of sodium sulfate, and allowed to stand for 12 hours for conducting ion-exchange.

(iii) The generated sulfuric acid was titrated using aqueous solution of 0.01 mol/L sodium hydroxide. To the solution, commercially available 0.1 w/v % phenolphthalein solution for titration was added as the indicator, and the end point was set to be a point at which the color changes to light reddish violet.

(iv) The ion-exchange capacity was obtained by the following formula.

$$\text{Ion-exchange capacity (meq/g)} = [\text{Concentration of aqueous solution of sodium hydroxide (mmol/mL)} \times (\text{Titration amount (mL)})] / [\text{Dry weight of sample (g)}]$$

(2) Proton Conductivity

The membrane-shaped sample was immersed for 24 hours in pure water at 25° C. Then the sample was held in a thermo-hygrostat at 80° C. and at a relative humidity of 25 to 95% for each 30 minutes at individual steps. After that, the proton conductivity was measured by the controlled potential AC impedance method.

The measurement apparatus used was an electrochemical measurement system of Solartron Inc. (Solartron 1287 Electrochemical Interface and Solartron 1255B Frequency Response Analyzer). The Controlled potential impedance measurement was performed by the 2-probe method and the proton conductivity was obtained. The AC amplitude was 50 mV. The sample used was a membrane having 10 mm in width and 50 mm in length. The measurement jig was fabricated by phenol resin, and the measurement portion was opened. The electrode used was platinum plates (2 plates each having a thickness of 100 μm). The electrodes were arranged so as the distance therebetween to become 10 mm and so as to be in parallel each other and be orthogonal to the longitudinal direction of the sample membrane, on front and rear side of the sample membrane.

(3) Number-Average Molecular Weight and Weight-Average Molecular Weight

The number-average molecular weight and the weight-average molecular weight of polymer were measured by GPC. As the integrated analyzer of ultraviolet ray detector and differential diffractometer, HLC-8022GPC manufactured by TOSOH Corporation was applied. As the GPC column, two columns of TSK gel Super HM-H (6.0 mm in inner diameter, 15 cm in length, manufactured by TOSOH Corporation) were used. The measurement was done using N-methyl-2-pyrrolidone solvent (N-methyl-2-pyrrolidone solvent containing 10 mmol/L of lithium bromide) under a condition of 0.1% by weight of sample concentration, 0.2 mL/min of flow rate, at 40° C. The number-average molecular weight and the weight-average molecular weight were obtained in terms of standard polystyrene.

(4) Membrane Thickness

The measurement was performed by ID-C112 Type manufactured by Mitsutoyo Co. mounted on a granite comparator stand BSG-20 manufactured by Mitsutoyo Co.

(5) Observation of Phase-Separated Structure by Transmission Electron Microscope (TEM)

A sample piece was immersed in an aqueous solution of 2% by weight of lead acetate as a staining agent, where the sample was allowed to stand for 24 hours at 25° C. Then, the sample subjected to a staining treatment was taken out from the solution, the sample was embedded in a visual light curing resin, the sample was irradiated with visual light for 30 seconds for fixing thereof.

Using an ultramicrome, the thin piece of 100 nm thickness was machined at room temperature, and thus obtained thin piece was fixed on a Cu grid and was subjected to TEM observation. The observation was done at an accelerating voltage of 100 kV, and the photographing was executed so that the magnification becomes ×8,000, ×20,000, and ×100,000, respectively. Microscope used was TEM H7100FA (manufactured by Hitachi, Ltd.)

(6) Measurement Method of Purity

Quantitative analysis was performed by Gas chromatography (GC) under the following conditions.
Column: DB-5 (manufactured by J&W Inc.) L=30 m, φ=0.53 mm,
D=1.50 μm
Carrier: Helium (Line velocity=35.0 cm/sec)
Analytical condition
  Inj. temp.=300° C.
  Detec. temp.=320° C.
  Oven=50° C.×1 min
  Rate=10° C./min
  Final=300° C.×15 min
  SP ratio=50:1

(7) Hot Water Resistance

The hot water resistance of the electrolyte membrane was evaluated by the measurement of dimensional change rate in hot water at 95° C. The electrolyte membrane was cut to a rectangular shape having about 5 cm in length and about 1 cm in width, and after immersion of the cut piece of the electrolyte membrane in water for 24 hours at 25° C., then the length (L1) was measured using Vernier calipers. After further immersion of the electrolyte membrane in hot water for 8 hours at 95° C., the length (L2) was again measured using Vernier calipers, and the magnitude of dimensional change was visually observed.

(8) Nuclear Magnetic Resonance (NMR) Spectra

The $^1$H-NMR measurement was performed under the following conditions, to confirm the structure and to quantify the molar composition ratio of the segment (A1) containing an ionic group to the segment (A2) not containing an ionic group. The molar composition ratio was calculated from the integral peak values appearing at 8.2 ppm (originated from disulfonate-4,4'-difluorobenzophenone) and 6.5 to 8.0 ppm (originated from all aromatic protons except for disulfonate-4,4'-difluorobenzophenone).

Apparatus: EX-270 manufactured by JOEL Ltd.
Resonance frequency: 270 MHz ($^1$H-NMR)
Measurement temperature: Room temperature
Dissolving solvent: DMSO-d6
Internal reference substance: TMS (0 ppm)
Cumulative number: 16

In addition, the measurement of solid $^{13}$C-CP/MAS spectra was performed under the following condition, and the presence or absence of remaining ketal group was confirmed.

Apparatus: CMX-300 Infinity, manufactured by Chemagnetics Inc.
Measurement temperature: Room temperature
Internal reference substance: Si rubber (1.56 ppm)
Measurement core: 75.188829 MHz
Pulse width: 90° pulse, 4.5 μsec
Pulse repetition time: ACQTM=0.03413 sec, PD=9 sec
Spectrum width: 30.003 kHz
Sample rotation: 7 kHz
Contact time: 4 msec (9) Chemical Stability The chemical stability of the electrolyte membrane was evaluated by immersion of about 10 mg of sample in 30 g of 0.05% by weight of hydrogen peroxide aqueous solution at 80° C. The weight-average molecular weight was determined before immersion and after 100 hours of immersion, respectively, and thus there was calculated the molecular weight-holding rate, that is,

[(Weight-average molecular weight after immersion)/
(Weight-average molecular weight before immersion)]×100(%).

Synthesis Example 1

Synthesis of 2,2-bis(4-hydroxyphenyl)-1,3-dioxolane (K-DHBP) represented by the general formula (G1)

[Chemical formula 22]

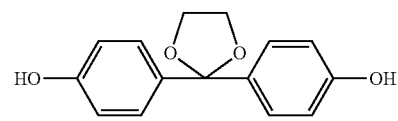

(G1)

To a 500 mL flask equipped with an agitator, a thermometer, and a distilling tube, there were added 49.5 g of 4,4'-dihydroxybenzophenone, 134 g of ethyleneglycol, 96.9 g of trimethyl orthoformate, and 0.50 g of p-toluenesulfonic acid hydrate, to be dissolved. The solution was agitated for 2 hours while being kept at the temperature of 78° C. to 82° C. Furthermore, the internal temperature was gradually increased to 120° C. and the heating was continued until the distilling of methyl formate, methanol, and trimethyl orthoformate completely stops. After cooling of the reaction solution to room temperature, the reaction solution was diluted by ethyl acetate, and then the organic layer was rinsed with 100 mL of 5% aqueous solution of potassium carbonate. After separating the solution, the solvent was distilled out. 80 mL of dichloromethane was added to the residue, crystal was deposited, and then after filtration and drying, 52.0 g of 2,2-bis(4-hydroxyphenyl)-1,3-dioxolane was obtained. Through the GC analysis of the crystal, 99.8% of 2,2-bis(4-hydroxyphenyl)-1,3-dioxolane and 0.2% of 4,4'-dihydroxybenzophenone were confirmed.

Synthesis Example 2

Synthesis of disodium 3,3'-disulfonate-4,4'-difluorobenzophenone represented by the general formula (G2)

[Chemical formula 23]

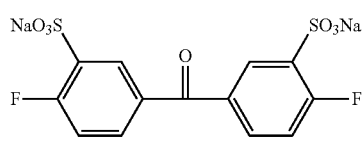

(G2)

A 109.1 g of 4,4'-difluorobenzophenone (Aldrich reagent) was caused to react in 150 mL of oleum (50% SO₃) (reagent of Wako Pure Chemical Industries, Ltd.) for 10 hours at 100° C. Then, the solution was gradually poured into a large volume of water, and after neutralizing the solution by using NaOH, 200 g of NaCl was added and the synthesized product was precipitated. The precipitated product obtained was separated by filtration, followed by recrystallization by using ethanol aqueous solution, and thus there was obtained disodium 3,3'-disulfonate-4,4'-difluorobenzophenone represented by the general formula (G2). The purity was 99.3%. The structure was confirmed by $^{1}$H-NMR. The impurities were quantitatively analyzed by capillary electrophoresis (organic substances) and by ion chromatography (inorganic substances).

EXAMPLE 1

Synthesis Of Oligomer a1' not Containing an Ionic Group, Represented by the General Formula (G3)

[Chemical formula 24]

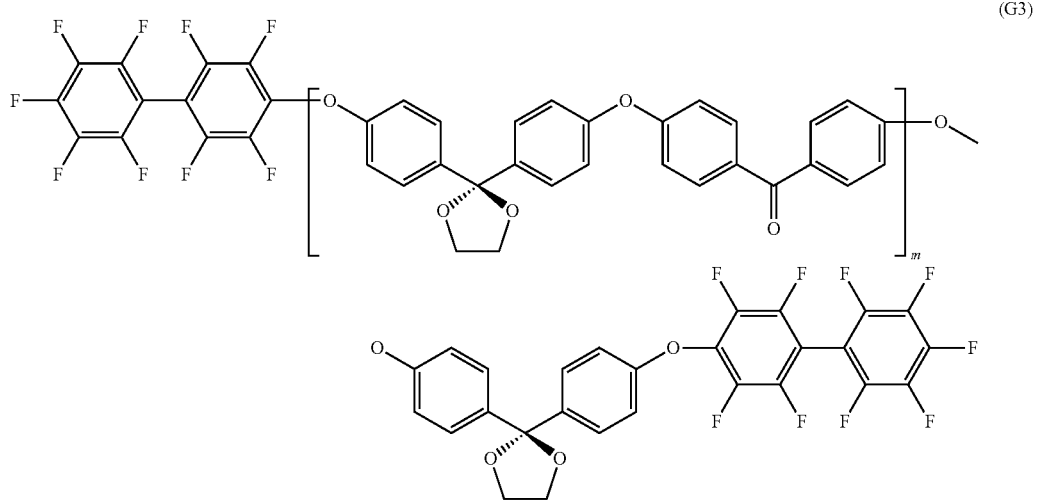

where, in (G3), m is a positive integer.

To a 100 mL three neck flask equipped with an agitator, a nitrogen gas inlet tube, and a Dean-Stark trap, there were added 16.59 g of potassium carbonate (Aldrich reagent, 120 mmol), 25.8 g of K-DHBP (100 mmol) obtained in the Synthesis Example 1, and 20.3 g of 4,4'-difluorobenzophenone (Aldrich reagent, 93 mmol). After nitrogen purge, the resultant content was dewatered in 300 mL of N-methylpyrrolidone (NMP) and 100 mL of toluene at 160° C. Again, the resultant content was heated and the toluene was removed, then was polymerized for 1 hour at 180° C. Purification was performed by reprecipitation through the use of a large quantity of methanol, and thus there was obtained the oligomer a1 not containing an ionic group (terminal OM group). The symbol M signifies Na or K, and the subsequent expression follows this example. The number-average molecular weight was 10,000.

To a 500 mL three neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a1 not containing an ionic group (terminal OM group). After nitrogen purge, the resultant content was dewatered at 100° C. in 100 mL of N-methylpyrrolidone (NMP) and 30 mL of cyclohexane. Then, the resultant content was heated and the cyclohexane was removed. Further 4.0 g of decafluorobiphenyl (Aldrich reagent, 12 mmol) was added and the solution was caused to react for 1 hour at 105° C. Purification was performed by reprecipitation through the use of a large quantity of isopropyl alcohol, and thus there was obtained the oligomer a1' not containing an ionic group (terminal fluoro group), represented by the formula (G3). The number-average molecular weight was 11,000, and the number-average molecular weight of the oligomer a1' not containing an ionic group was obtained as 10,400 (subtracting the linker moiety (molecular weight of 630)).

Synthesis of Oligomer a2 Containing an Ionic Group, Represented by the General Formula (G4)

[Chemical formula 25]

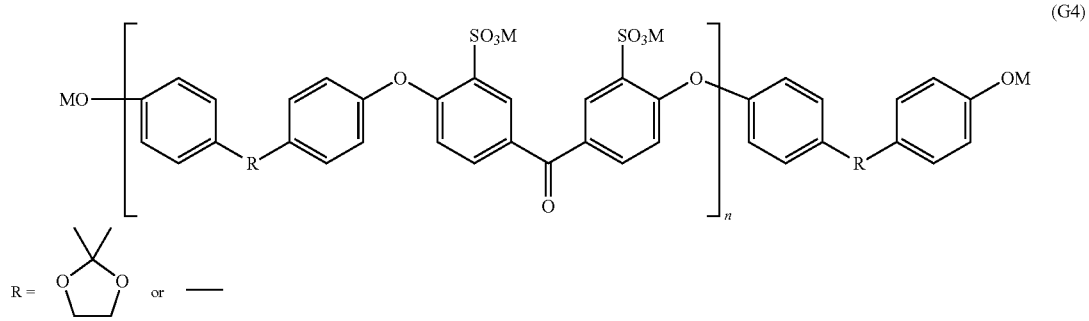

where, in (G4), M is Na or K, and n is a positive integer.

To a 1000 mL three neck flask equipped with an agitator, a nitrogen gas inlet tube, and a Dean-Stark trap, there were added 27.6 g of potassium carbonate (Aldrich reagent, 200 mmol), 12.9 g (50 mmol) of K-DHBP obtained in the Synthesis Example 1, 9.3 g of 4,4'-biphenol (Aldrich reagent, 50 mmol), 39.3 g (93 mmol) of disodium 3,3'-disulfonate-4,4'-difluorobenzophenone obtained in the Synthesis Example 2, and 17.9 g of 18-crown-6-ether (82 mmol, Wako Pure Chemical Industries, Ltd.) After nitrogen purge, the resultant content was dewatered in 300 mL of N-methylpyrrolidone (NMP) and 100 mL of toluene at 170° C., and then the resultant content was heated and the toluene was removed. The resultant content was polymerized for 1 hour at 180° C. Purification was performed by reprecipitation through the use of a large quantity of isopropyl alcohol, and thus there was obtained the oligomer a2 containing an ionic group (terminal OM group), represented by the formula (G4). The number-average molecular weight was 16,000.

Synthesis of Block Copolymer B1 Containing:
Oligomer a2 as the Segment (a1) Containing an Ionic Group; Oligomer a1 as the Segment (a2) not Containing an Ionic Group; and Octafluorobiphenylene as the Linker Moiety To a 500 mL three neck flask equipped with an agitator, a nitrogen gas inlet tube, and a Dean-Stark trap, there were added 0.56 g of potassium carbonate (Aldrich reagent, 4 mmol), and 16 g (1 mmol) of the oligomer a2 containing an ionic group (terminal OM group). After nitrogen purge, the content was dewatered at 100° C. in 100 mL of N-methylpyrrolidone (NMP) and 30 mL of cyclohexane, and then the resultant content was heated and the cyclohexane was removed. Furthermore, the addition of 11 g (1 mmol) of oligomer a1' not containing an ionic group (terminal fluoro group) causes the solution to react for 24 hour at 105° C. Purification was performed by reprecipitation through the use of a large quantity of isopropyl alcohol, and thus there was obtained the block copolymer b1. The weight-average molecular weight was 280,000.

The block copolymer b1 contained 50 mol % of constituent unit represented by the general formula (S1) as the segment (A1) containing an ionic group, and 100 mol % of constituent unit represented by the general formula (S2) as the segment (A2) not containing an ionic group. The block copolymer b1 had the molecular weight-holding rate of 81%, exhibiting excellent chemical stability.

Thus obtained block copolymer b1 was dissolved in 25% by weight of N-methylpyrrolidone (NMP), the resultant solution was pressure-filtered using a glass fiber filter, and the filtered product was treated by performing flow-expanding coating for coating on a glass substrate. Then the glass substrate was dried for 4 hours at 100° C., followed by heat-treating in a nitrogen atmosphere for 10 minutes at 150° C. and the polyketalketone membrane (thickness of 25 μm) was obtained. The solubility of the polymer was extremely high. The membrane was immersed in 10% by weight of sulfuric acid aqueous solution for 24 hours at 95° C., and after proton substitution and deprotection reaction, the resultant substance was then immersed in a large excessive volume of pure water for 24 hours, followed by sufficiently rinsing, and thus the polymer electrolyte membrane was obtained.

The ion-exchange capacity obtained from neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. In addition, the dimensional change rate was small, giving 10%, which showed excellent hot water resistance.

Furthermore, through TEM observation, the co-continuous phase-separated structure with a domain size of 20 nm was able to be confirmed. Both the domain containing an ionic group and the domain not containing an ionic group formed a continuous phase.

EXAMPLE 2

Synthesis of Oligomer a3 not Containing an Ionic Group, Represented by the General Formula (G3)

The oligomer a3 not containing an ionic group (terminal OM group), was synthesized by the method of Example 1 except that the charge quantity of 4,4'-difluorobenzophenone was changed to 20.7 g (Aldrich reagent, 95 mmol). The number-average molecular weight was 15,000.

The oligomer a3' not containing an ionic group (terminal fluoro group), represented by the formula (G3) was synthesized by the method of Example 1 except that 30.0 g (2 mmol) of the oligomer a3 not containing an ionic group (terminal OM group), was charged instead of the oligomer a1 not containing an ionic group (terminal OM group). The number-average molecular weight was 16,000. The number-average molecular weight of the oligomer a3' not containing an ionic group was obtained as 15,400 (subtracting the linker moiety (molecular weight of 630)).

Synthesis of Oligomer a4 Containing an Ionic Group, Represented by the General Formula (G4)

The oligomer a4 containing an ionic group (terminal OM group), represented by the formula (G4) was obtained by the method of Example 1 except that the charge quantity of 3,3'-difulformate-4,4'-difluorobenzophenone was changed to 40.1 g (95 mmol). The number-average molecular weight was 21,000.

Synthesis of Block Copolymer b2 Containing: Oligomer a4 as the Segment (a1) Containing an Ionic Group; Oligomer a3 as the Segment (a2) not Containing an Ionic Group; and Octafluorobiphenylene as the Linker Moiety The block copolymer b2 was obtained by the method of Example 1 except that the oligomer a2 containing an ionic group (terminal OM group), was changed to 21 g (1 mmol) of the oligomer a4 containing an ionic group (terminal OM group), and that the oligomer a1' not containing an ionic group (terminal fluoro group), was changed to 16 g (1 mmol) of the oligomer a3' not containing an ionic group (terminal fluoro group). The weight-average molecular weight was 400,000.

The block copolymer b2 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 83%, exhibiting excellent chemical stability.

A polymer electrolyte membrane was formed using a solution of 25% by weight of N-methylpyrrolidone (NMP) in which the obtained block copolymer b2 was dissolved, through the use of the method of EXAMPLE 1.

The ion-exchange capacity obtained from neutralization titration was 1.6 meq/g, and the molar composition ratio (A1/A2) obtained from $^1$H-NMR was 40 mole/60 mol=0.67, which showed no residual ketal group. The electrolyte membrane was extremely tough, and through visual observation, the membrane was found to be a transparent and homogeneous membrane. The proton conductivity was 200 mS/cm at 80° C. and 85% RH, and 0.8 mS/cm at 80° C. and 25% RH, which showed excellent proton conduction under low-humidification conditions. The dimensional change rate was small, giving 6%, which showed excellent hot water resistance.

Furthermore, through TEM observation, the co-continuous phase-separated structure with a domain size of 35 nm was able to be confirmed. Both the domain containing an ionic group and the domain not containing an ionic group formed a continuous phase.

EXAMPLE 3

Synthesis of Oligomer a5' not Containing an Ionic Group, Represented by the General Formula (G3)

The oligomer a5 not containing an ionic group (terminal OM group), was synthesized by the method of Example 1 except that the charge quantity of 4,4'-difluorobenzophenone was changed to 21.4 g (Aldrich reagent, 98 mmol). The number-average molecular weight was 20,000.

The oligomer a5' not containing an ionic group (terminal fluoro group), represented by the formula (G3) was synthesized by the method of Example 1 except that 40.0 g (2 mmol) of the oligomer a5 not containing an ionic group (terminal OM group), was charged instead of the oligomer a1 not containing an ionic group (terminal OM group). The number-average molecular weight was 21,000. The number-average molecular weight of the oligomer a5' not containing an ionic group was obtained as 20,400 (subtracting the linker moiety (molecular weight of 630)).

Synthesis of Oligomer a6 Containing an Ionic Group, Represented by the General Formula (G4)

The oligomer a6 containing an ionic group (terminal OM group), represented by the formula (G4) was synthesized by the method of Example 1 except that the charge quantity of 3,3'-disulfonate-4,4'-difluorobenzophenone was changed to 41.4 g (98 mmol) and that bisphenol was changed to 25.8 g (100 mmol) of K-DHBP. The number-average molecular weight was 33,000.

Synthesis of Block Copolymer b3 Containing: Oligomer a6 as the Segment (a1) Containing an Ionic Group; Oligomer a5 as the Segment (a2) not Containing an Ionic Group; and Octafluorobiphenylene as the Linker Moiety The block copolymer b3 was obtained by the method of Example 1 except that the oligomer a2 containing an ionic group (terminal OM group), was changed to 33 g (1 mmol) of the oligomer a6 containing an ionic group (terminal OM group), and that the oligomer a1' not containing an ionic group (terminal fluoro group), was changed to 21 g (1 mmol) of the oligomer a5' not containing an ionic group (terminal fluoro group). The weight-average molecular weight was 360,000.

The block copolymer b3 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed using a solution of 25% by weight of N-methylpyrrolidone (NMP)

in which the obtained block copolymer b3 was dissolved, through the use of the method of Example 1.

The ion-exchange capacity obtained from the neutralization titration was 2.0 meq/g, and the molar composition ratio (A1/A2) obtained from $^1$H-NMR was 50 mole/50 mol=1.0, which showed no residual ketal group. The electrolyte membrane was extremely tough, and through visual observation, the membrane was found to be a transparent and homogeneous membrane. The proton conductivity was 290 mS/cm at 80° C. and 85% RH, and 4 mS/cm at 80° C. and 25% RH, which showed excellent proton conduction under low-humidification conditions. The dimensional change rate was relatively small, giving 13%, which showed excellent hot water resistance.

Furthermore, through TEM observation, the co-continuous phase-separated structure with a domain size of 50 nm was able to be confirmed. Both the domain containing an ionic group and the domain not containing an ionic group formed a continuous phase.

EXAMPLE 4

Synthesis of Block Copolymer b4 Containing:
Oligomer a4 as the Segment (a1) Containing an
Ionic Group; Oligomer a1 as the Segment (a2) not
Containing an Ionic Group; and
Octafluorobiphenylene as the Linker Moiety The block copolymer b4 was obtained by the method of Example 1 except that the oligomer a2 containing an ionic group (terminal OM group), was changed to 21 g (1 mmol) of the oligomer a4 containing an ionic group (terminal OM group). The weight-average molecular weight was 230,000.

The block copolymer b4 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 85%, exhibiting excellent chemical stability.

A polymer electrolyte membrane was formed using a solution of 25% by weight of N-methylpyrrolidone (NMP) in which the obtained block copolymer b4 was dissolved, through the use of the method of Example 1.

The ion-exchange capacity obtained from the neutralization titration was 2.2 meq/g, and the molar composition ratio (A1/A2) obtained from $^1$H-NMR was 60 mole/40 mol=1.5, which showed no residual ketal group. The electrolyte membrane was extremely tough, and through visual observation, the membrane was found to be a transparent and homogeneous membrane. The proton conductivity was 350 mS/cm at 80° C. and 85% RH, and 2 mS/cm at 80° C. and 25% RH, which showed excellent proton conduction under low-humidification conditions. In addition, the dimensional change rate was relatively small, giving 15%, which showed excellent hot water resistance.

Furthermore, through TEM observation, the lamellar phase-separated structure with a domain size of 30 nm was able to be confirmed. Both the domain containing an ionic group and the domain not containing an ionic group formed a continuous phase.

EXAMPLE 5

Synthesis of Block Copolymer b5 Containing:
Oligomer a6 as the Segment (a1) Containing an
Ionic Group; Oligomer a1 as the Segment (a2) not
Containing an Ionic Group; and
Octafluorobiphenylene as the Linker Moiety The block copolymer b5 was obtained by the method of Example 1 except that the oligomer a2 containing an ionic group (terminal OM group), was changed to 33 g (1 mmol) of the oligomer a6 containing an ionic group (terminal OM group). The weight-average molecular weight was 220,000.

The block copolymer b5 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 86%, exhibiting excellent chemical stability.

A polymer electrolyte membrane was formed using a solution of 25% by weight of N-methylpyrrolidone (NMP) in which the obtained block copolymer b5 was dissolved, through the use of the method of EXAMPLE 1.

The ion-exchange capacity obtained from the neutralization titration was 2.5 meq/g, and the molar composition ratio (A1/A2) obtained from $^1$H-NMR was 67 mole/33 mol=2.1, which showed no residual ketal group. The electrolyte membrane was extremely tough, and through visual observation, the membrane was found to be a transparent and homogeneous membrane. The proton conductivity was 400 mS/cm at 80° C. and 85% RH, and 3 mS/cm at 80° C. and 25% RH, which showed excellent proton conduction under low-humidification conditions. In addition, the dimensional change rate was relatively small, giving 18%, which showed excellent hot water resistance.

Furthermore, through TEM observation, the lamellar phase-separated structure with a domain size of 43 nm was able to be confirmed. Both the domain containing an ionic group and the domain not containing an ionic group formed a continuous phase.

EXAMPLE 6

Synthesis of Oligomer a7 Containing an Ionic
Group, Represented by the General Formula (G4)

The oligomer a7 containing an ionic group (terminal OM group), represented by the formula (G4) was synthesized by the method of Example 1 except that the charge quantity of 3,3'-disulfonate-4,4'-difluorobenzophenone was changed to 42.2 g (99 mmol). The number-average molecular weight was 40,000.

Synthesis of Block Copolymer b6 Containing:
Oligomer a7 as the Segment (a1) Containing an
Ionic Group; Oligomer a1 as the Segment (a2) not
Containing an Ionic Group; and
Octafluorobiphenylene as the Linker Moiety The block copolymer b6 was obtained by the method of Example 1 except that the oligomer a2 containing an ionic group (terminal OM group), was changed to 40 g (1 mmol) of the oligomer a7 containing an ionic group (terminal OM group). The weight-average molecular weight was 210,000.

The block copolymer b6 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 85%, exhibiting excellent chemical stability.

A polymer electrolyte membrane was formed using a solution of 25% by weight of N-methylpyrrolidone (NMP) in which the obtained block copolymer b6 was dissolved, through the use of the method of Example 1.

The ion-exchange capacity obtained from the neutralization titration was 2.7 meq/g, and the molar composition ratio (A1/A2) obtained from $^1$H-NMR was 70 mole/30 mol=2.8, which showed no residual ketal group. The electrolyte membrane was extremely tough, and through visual observation, the membrane was found to be a transparent and homogeneous membrane. The proton conductivity was 430 mS/cm at 80° C. and 85% RH, and 2.9 mS/cm at 80° C. and 25% RH, which showed excellent proton conduction under low-humidification conditions. In addition, the dimensional change rate was relatively small, giving 26%, which showed excellent hot water resistance.

Furthermore, through TEM observation, the lamellar phase-separated structure with a domain size of 53 nm was able to be confirmed. Both the domain containing an ionic group and the domain not containing an ionic group formed a continuous phase.

Comparative Example 1

Individual characteristics were evaluated using commercially available Nafion (registered trade name) NRE211CS membrane (manufactured by DuPont). The ion-exchange capacity obtained from neutralization titration was 0.9 meq/g. Through visual observation, the membrane was found to be a transparent and homogeneous membrane. Through the TEM observation, a clear phase-separated structure was not able to be confirmed. The proton conductivity was 100 mS/cm at 80° C. and 85% RH, and 3 mS/cm at 80° C. and 25% RH. When the membrane was immersed in hot water, vigorous swelling occurred, and was difficult in handling and in some cases, was broken when grasped.

Comparative Example 2

Synthesis of Polyether Ketone Oligomer c1 not Containing an Ionic Group and a Ketal Group A polyether ketone oligomer not containing an ionic group was synthesized by the method of Example 1 except that 25.8 g (100 mmol) of K-DHBP was changed to 21.4 g (100 mmol) of 4,4'-dihydroxybenzophenone (DHBP). From the initial stage of polymerization, polymer deposited, and the progress of the polymerization was difficult. Because of the property of insoluble in solvent, the polymerization of block copolymer was difficult, thus the evaluation as the electrolyte membrane could not be given.

Comparative Example 3

Using the method described in Japanese Patent Laid-Open No. 2009-235158, a polyethersulfone-based block copolymer was synthesized. First, 4,4'-dichlorodiphenyl sulfone was caused to react in oleum. After completed the reaction, salting-out was conducted using sodium chloride to obtain 3,3'-sodiumdisulfonate-4,4'-dichlorodiphenylsulfone (hereinafter referred to as SDCDPS). Then, to a single-neck eggplant-shape flask equipped with a Dean-Stark tube, there were charged 3.16 g (6.0 mmol) of the SDCDPS, 1.34 g (7.2 mmol) of 4,4'-biphenol, 1.49 g (10.8 mmol) of potassium carbonate, 23 mL of NMP, and 20 mL of toluene, in a nitrogen atmosphere. The mixture was held at 150° C. for 2 hours to remove water from the system by azeotropic distillation. After that, the mixture was heated to 180° C. to perform reaction for 16 hours. After allowed to cool, the reaction solution was poured in water, to which potassium chloride was added. The deposit was filtered to collect, and the cake was dried under a reduced pressure at 60° C., thus obtained a hydrophilic oligomer having OH group at both ends thereof.

Next, to a single-neck eggplant-shape flask equipped with a Dean-Stark tube, there were charged 4.31 g (15.0 mmol) of 4,4'-dichlorophenylsulfone, 3.05 g (16.4 mmol) of 4,4'-biphenol, 3.39 g (24.5 mmol) of potassium carbonate, 35 mL of NMP, and 20 mL of toluene, in a nitrogen atmosphere. The mixture was held at 150° C. for 2 hours to remove water from the system by azeotropic distillation. After that, the mixture was heated to 180° C. to perform reaction for 12 hours. After allowed to cool, the reaction solution was poured in water. The deposit was filtered to collect, and the cake was further rinsed with methanol. The cake was dried under reduced pressure at 100° C., thus obtained a hydrophobic oligomer having OH group at both ends thereof.

To a single neck eggplant-shape flask equipped with a three-way stop cock, there were added 0.45 g of the hydrophilic oligomer, 0.20 g of the hydrophobic oligomer, and 5.5 mL of NMP, in a nitrogen atmosphere. The mixture was heated to 80° C. to dissolve the hydrophilic oligomer and the hydrophobic oligomer. After the mixture was air-cooled, there were added 0.02 g (0.06 mmol) of decafluorobiphenyl and 0.01 g (0.07 mmol) of potassium carbonate. The mixture performed reaction for 18 hours at 120° C. After allowed to cool, the reaction solution was diluted with NMP, which was then poured in isopropanol. The appeared precipitate was filtered and was rinsed with water. After that, thus obtained polymer was subjected to acid treatment. The polymer was agitated in an aqueous solution of 1.0 M sulfuric acid at room temperature for 2 days. Then the mixture was filtered to collect the polymer. By fully rinsing the polymer with pure water, and then by drying at 60° C. for 10 hours, there obtained light brown polymer. The weight-average molecular weight of the polymer was 150,000, which failed to attain large molecular weight. The molecular weight-holding rate was 10%, which was poor in chemical stability owing to the small quantity of constituent units represented by the general formulae (S1) and (S2).

The ion-exchange capacity obtained from neutralization titration was 1.8 meq/g. The electrolyte membrane was rigid and brittle, and through visual observation, the membrane was found to be an opaque and non-homogeneous membrane. The proton conductivity was 150 mS/cm at 80° C. and 85% RH, and 0.1 mS/cm at 80° C. and 25% RH, which showed inferior proton conduction under low-humidification conditions to that of Examples 1 to 4. Furthermore, the dimensional change rate L2/L1 was large, giving 80%, which showed poor hot water resistance.

Moreover, through the TEM observation, the lamellar phase-separated structure with a domain size of 30 nm was able to be confirmed, and both the domain containing an ionic group and the domain not containing an ionic group formed continuous phase.

Comparative Example 4

Synthesis of Oligomer c2' not Containing an Ionic Group, Represented by the Formula (G5)

[Chemical formula 26]

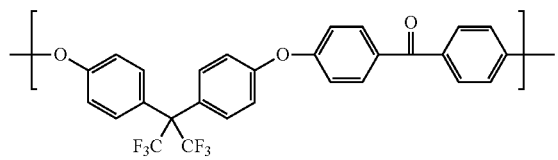

(G5)

The oligomer c2 not containing an ionic group (terminal OM group), was synthesized by the method of Example 1 except that 25.8 g (100 mmol) of K-DHBP was changed to 33.6 g (100 mmol) of 2,2-bis(4-hydroxyphenyl)hexafluoropropane. The number-average molecular weight was 13,000.

The oligomer c2' not containing an ionic group (terminal fluoro group), represented by the formula (G5) was synthesized by the method of Example 1 except that the oligomer c2 not containing an ionic group (terminal OM group), (2 mmol) was charged instead of the oligomer a1 not containing an ionic group (terminal OM group). The number-average molecular weight was 14,000. The number-average molecular weight of the oligomer c2' not containing an ionic group was obtained as 13,400 (subtracting the linker moiety (molecular weight of 630)).

Synthesis of oligomer c3 containing an ionic group, represented by the formula (G6)

[Chemical formula 27]

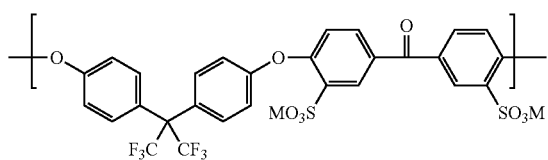

(G6)

where, M is Na or K.

The oligomer c3 containing an ionic group (terminal OM group), represented by the formula (G6) was obtained by the method of Example 1 except that 12.9 g (50 mmol) of K-DHBP and 9.3 g of 4,4'-bisphenol (Aldrich reagent, 50 mmol) were changed to 33.6 g (100 mmol) of 2,2-bis(4-hydroxyphenyl)hexafluoropropane. The number-average molecular weight was 19,000.

Synthesis of Block Copolymer d1

The block copolymer d1 was obtained by the method of Example 1 except that the oligomer a2 containing an ionic group (terminal OM group), was changed to 19 g (1 mmol) of the oligomer c3 containing an ionic group (terminal OM group), and that the oligomer a1' not containing an ionic group (terminal fluoro group), was changed to 14 g (1 mmol) of the oligomer c2' not containing an ionic group (terminal fluoro group). The weight-average molecular weight was 160,000.

The block copolymer d1 contained 0 mol % of constituent unit represented by the general formula (S1) as the segment (A1) containing an ionic group, and 0 mol % of constituent unit represented by the general formula (S2) as the segment (A2) not containing an ionic group. The molecular weight-holding rate was 31%, exhibiting poor chemical stability owing to the lack of constituent unit represented by the general formulae (S1) and (S2), respectively.

A polymer electrolyte membrane was formed using a solution of 25% by weight of N-methylpyrrolidone (NMP) in which the obtained block copolymer d1 was dissolved, through the use of the method of EXAMPLE 1.

The ion-exchange capacity obtained from the neutralization titration was 2.3 meq/g. When the membrane was immersed in hot water, vigorous swelling occurred, and was difficult in handling and in some cases, was broken when grasped.

EXAMPLE 7

Synthesis of Oligomer a11' not Containing an Ionic Group, Represented by the General Formula (G13)

[Chemical formula 28]

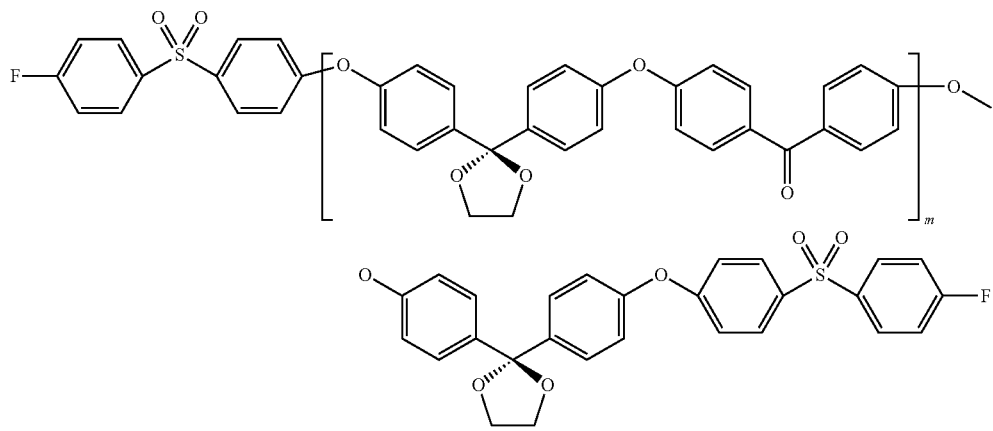

(G13)

where, m is a positive integer.

To a 100 mL three-neck flask equipped with an agitator, a nitrogen gas inlet tube, and a Dean-Stark trap, there were added 16.59 g of potassium carbonate (Aldrich reagent, 120 mmol), 25.8 g of K-DHBP (100 mmol) obtained in the Synthesis Example 1, and 20.3 g of 4,4'-difluorobenzophenone (Aldrich reagent, 93 mmol). After nitrogen purge, the resultant content was dewatered at 160° C. in 300 mL of N-methylpyrrolidone (NMP) and 100 mL of toluene. Again, the resultant content was heated and toluene was removed, which was then polymerized for 1 hour at 180° C. Purification was performed by reprecipitation through the use of a large quantity of methanol, and thus there was obtained the oligomer a11 not containing an ionic group (terminal OM group). The number-average molecular weight was 10,000.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then resultant content was heated and the cyclohexane was removed. Furthermore, 3.0 g of bis(4-fluorophenylsulfone) (Aldrich reagent, 12 mmol) was added and the solution was caused to react for 1 hour at 105° C. Purification was performed by reprecipitation through the use of a large quantity of isopropyl alcohol, and thus there was obtained the oligomer a11' not containing an ionic group (terminal fluoro group), represented by the formula (G13). The number-average molecular weight was 11,000. The number-average molecular weight of the oligomer a11' not containing an ionic group was obtained as 10,530 (subtracting the linker moiety (molecular weight of 470)).

Synthesis of Oligomer a12 Containing an Ionic Group, Represented by the General Formula (G14)

[Chemical formula 29]

To a 100 mL three-neck flask equipped with an agitator, a nitrogen gas inlet tube, and a Dean-Stark trap, there were added 27.6 g of potassium carbonate (Aldrich reagent, 200 mmol), 12.9 g (50 mmol) of K-DHBP obtained in the Synthesis Example 1, 9.3 g of 4,4'-biphenol (Aldrich reagent, 50 mmol), 39.3 g (93 mmol) of disodium 3,3'-disulfonate-4,4'-difluorobenzophenone obtained in the Synthesis Example 2, and 17.9 g of 18-crown-6-ether (82 mmol, Wako Pure Chemical Industries, Ltd.) After nitrogen purge, the resultant content was dewatered at 170° C. in 300 mL of N-methylpyrrolidone (NMP) and 100 mL of toluene, and then the resultant content was heated and the toluene was removed. The content was polymerized at 180° C. for 1 hour. Purification was performed by reprecipitation through the use of a large quantity of isopropyl alcohol, and thus there was obtained the oligomer a12 containing an ionic group (terminal OM group), represented by the formula (G14). The number-average molecular weight was 16,000.

Synthesis of Block Copolymer b11 Containing: Oligomer a12 as the Segment (a1) Containing an Ionic Group; Oligomer a11' as the Segment (a2) not Containing an Ionic Group; and Diphenylsulfone as the Linker Moiety To a 500 mL three-neck flask equipped with an agitator, a nitrogen gas inlet tube, and a Dean-Stark trap, there were added 0.56 g of potassium carbonate (Aldrich reagent, 4 mmol), and 16 g (1 mmol) of the oligomer a12 containing an ionic group (terminal OM group). After nitrogen purge, the resultant content was dewatered at 100° C. in 100 mL of N-methylpyrrolidone (NMP) and 30 mL of cyclohexane, and then the content was heated and the cyclohexane was removed. Furthermore, 11 g (1 mmol) of oligomer a11' not containing an ionic group (terminal fluoro group), was added to bring the solution to react at 105° C. for 24 hour. Purification was performed by reprecipitation through the use of a large quantity of isopropyl alcohol, and thus there was obtained the block copolymer b11. The weight-average molecular weight was 280,000, and the molecular weight distribution was 2.1.

The block copolymer b11 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 81%, exhibiting excellent chemical stability.

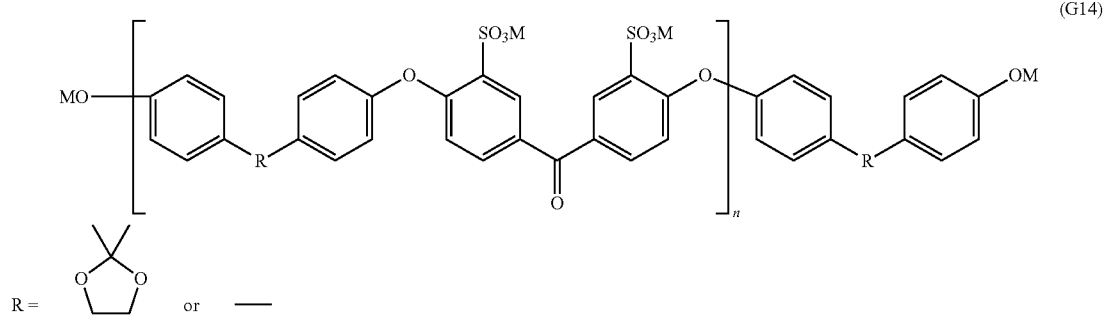

where, in (G14), M is Na or K, and n is a positive integer.

Thus obtained block copolymer b11 was dissolved in 25% by weight of N-methylpyrrolidone (NMP), the resultant solution was pressure-filtered using a glass fiber filter, and the filtered product was treated by performing flow-expanding coating for coating on a glass substrate. Then the glass substrate was dried for 4 hours at 100° C., followed by heat-treating in a nitrogen atmosphere for 10 minutes at 150° C. and a polyketalketone membrane (thickness of 25 μm) was obtained. The solubility of the polymer was extremely favorable. The membrane was immersed in 10% by weight of sulfuric acid aqueous solution for 24 hours at 95° C., and after proton substitution and deprotection reaction, the resultant substance was then immersed in a large excessive volume of pure water for 24 hours, followed by sufficiently rinsing, and thus there was obtained a polymer electrolyte membrane.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. In addition, the dimensional change rate was small, giving 10%, which showed excellent hot water resistance.

Moreover, through TEM observation, the co-continuous phase-separated structure with a domain size of 20 nm was able to be confirmed, and both the domain containing an ionic group and the domain not containing an ionic group formed continuous phase.

EXAMPLE 8

Synthesis of Oligomer a13' not Containing an Ionic Group, Represented by the General Formula (G13)

The oligomer a13 not containing an ionic group (terminal OM group), was synthesized by the method of Example 7 except that the charge quantity of 4,4'-difluorobenzophenone was changed to 20.7 g (Aldrich reagent, 95 mmol). The number-average molecular weight was 15,000.

The oligomer a13' not containing an ionic group (terminal fluoro group), represented by the formula (G13) was synthesized by the method of Example 7 except that 30.0 g (2 mmol) of the oligomer a13 not containing an ionic group (terminal OM group), was charged instead of the oligomer a11 not containing an ionic group (terminal OM group). The number-average molecular weight was 16,000. The number-average molecular weight of the oligomer a13' not containing an ionic group was obtained as 15,530 (subtracting the linker moiety (molecular weight of 470)).

Synthesis of Oligomer a14 Containing an Ionic Group, Represented by the General Formula (G14)

The oligomer a14 containing an ionic group (terminal OM group), represented by the formula (G14) was obtained by the method of Example 7 except that the charge quantity of 3,3'-difulformate-4,4'-difluorobenzophenone was changed to 40.1 g (95 mmol). The number-average molecular weight was 21,000.

Synthesis of Block Copolymer b12 Containing: Oligomer a14 as the Segment (a1) Containing an Ionic Group; Oligomer a13' as the Segment (a2) not Containing an Ionic Group; and Diphenylsulfone as the Linker Moiety The block copolymer b12 was obtained by the method of Example 7 except that the oligomer a12 containing an ionic group (terminal OM group), was changed to 21 g (1 mmol) of the oligomer a14 containing an ionic group (terminal OM group), and that the oligomer a11' not containing an ionic group (terminal fluoro group), was changed to 16 g (1 mmol) of the oligomer a13' not containing an ionic group (terminal fluoro group). The weight-average molecular weight was 400,000, and the molecular weight distribution was 2.2.

The block copolymer b12 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 83%, exhibiting excellent chemical stability.

A polymer electrolyte membrane was formed from a solution of 25% by weight of N-methylpyrrolidone (NMP) in which the obtained block copolymer b12 was dissolved, through the use of the method of EXAMPLE 7.

The ion-exchange capacity obtained from the neutralization titration was 1.6 meq/g, and the molar composition ratio (A1/A2) obtained from $^1$H-NMR was 40 mole/60 mol=0.67, which showed no residual ketal group. The electrolyte membrane was extremely tough, and through visual observation, the membrane was found to be a transparent and homogeneous membrane. The proton conductivity was 200 mS/cm at 80° C. and 85% RH, and 0.8 mS/cm at 80° C. and 25% RH, which showed excellent proton conduction under low-humidification conditions. Furthermore, the dimensional change rate was small, giving 6%, which showed excellent hot water resistance.

Moreover, through TEM observation, the co-continuous phase-separated structure with a domain size of 35 nm was able to be confirmed, and both the domain containing an ionic group and the domain not containing an ionic group formed continuous phase.

EXAMPLE 9

Synthesis of Oligomer a15' not Containing an Ionic Group, Represented by the General Formula (G13)

The oligomer a15 not containing an ionic group (terminal OM group), was synthesized by the method of Example 7 except that the charge quantity of 4,4'-difluorobenzophenone was changed to 21.4 g (Aldrich reagent, 98 mmol). The number-average molecular weight was 20,000.

The oligomer a15' not containing an ionic group (terminal fluoro group), represented by the formula (G13) was synthesized by the method of Example 7 except that 40.0 g (2 mmol) of the oligomer a15 not containing an ionic group (terminal OM group), was charged instead of the oligomer a11 not containing an ionic group (terminal OM group). The number-average molecular weight was 21,000. The number-average molecular weight of the oligomer a15' not containing an ionic group was obtained as 20,530 (subtracting the linker moiety (molecular weight of 470)).

Synthesis of Oligomer a16 Containing an Ionic Group, Represented by the General Formula (G14)

The oligomer a16 containing an ionic group (terminal OM group), represented by the formula (G14) was obtained by the method of Example 7 except that the charge quantity of 3,3'-disulfonate-4,4'-difluorobenzophenone was changed to 41.4 g (98 mmol) and that bisphenol was changed to 25.8 g (100 mmol) of K-DHBP. The number-average molecular weight was 33,000.

Synthesis of Block Copolymer b13 Containing: Oligomer a16 as the Segment (a1) Containing an Ionic Group; Oligomer a15' as the Segment (a2) not Containing an Ionic Group; and Diphenylsulfone as the Linker Moiety The block copolymer b13 was obtained by the method of Example 7 except that the oligomer a12 containing an ionic group (terminal OM group), was changed to 33 g (1 mmol) of the oligomer a16 containing an ionic group (terminal OM group), and that the oligomer a11' not containing an ionic group (terminal fluoro group), was changed to 21 g (1 mmol) of the oligomer a15' not containing an ionic group (terminal fluoro group). The weight-average molecular weight was 360,000, and the molecular weight distribution was 2.1.

The block copolymer b13 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight of N-methylpyrrolidone (NMP) in which the obtained block copolymer b13 was dissolved, through the use of the method of EXAMPLE 7.

The ion-exchange capacity obtained from the neutralization titration was 2.0 meq/g, and the molar composition ratio (A1/A2) obtained from $^1$H-NMR was 50 mole/50 mol=1.0, which showed no residual ketal group. The electrolyte membrane was extremely tough, and through visual observation, the membrane was found to be a transparent and homogeneous membrane. The proton conductivity was 290 mS/cm at 80° C. and 85% RH, and 4 mS/cm at 80° C. and 25% RH, which showed excellent proton conduction under low-humidification conditions. Furthermore, the dimensional change rate was relatively small, giving 13%, which showed excellent hot water resistance.

Moreover, through TEM observation, the co-continuous phase-separated structure with a domain size of 50 nm was able to be confirmed, and both the domain containing an ionic group and the domain not containing an ionic group formed continuous phase.

EXAMPLE 10

Synthesis of Block Copolymer b14 Containing: Oligomer a14 as the Segment (a1) Containing an Ionic Group; Oligomer a11 as the Segment (a2) not Containing an Ionic Group; and Diphenylsulfone as the Linker Moiety The block copolymer b14 was obtained by the method of Example 7 except that the oligomer a12 containing an ionic group (terminal OM group), was changed to 21 g (1 mmol) of the oligomer a14 containing an ionic group (terminal OM group). The weight-average molecular weight was 320,000, and the molecular weight distribution was 2.2.

The block copolymer b14 contained 50 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 85%, exhibiting excellent chemical stability.

A polymer electrolyte membrane was formed from a solution of 25% by weight of N-methylpyrrolidone (NMP) in which the obtained block copolymer b14 was dissolved, through the use of the method of EXAMPLE 7.

The ion-exchange capacity obtained from the neutralization titration was 2.2 meq/g, and the molar composition ratio (A1/A2) obtained from $^1$H-NMR was 60 mole/40 mol=1.5, which showed no residual ketal group. The electrolyte membrane was extremely tough, and through visual observation, the membrane was found to be a transparent and homogeneous membrane. The proton conductivity was 350 mS/cm at 80° C. and 85% RH, and 2 mS/cm at 80° C. and 25% RH, which showed excellent proton conduction under low-humidification conditions. Furthermore, the dimensional change rate was relatively small, giving 15%, which showed excellent hot water resistance.

Moreover, through TEM observation, the lamellar phase-separated structure with a domain size of 30 nm was able to be confirmed, and both the domain containing an ionic group and the domain not containing an ionic group formed continuous phase.

EXAMPLE 11

Synthesis of Oligomer a17' Containing an Ionic Group, Represented by the General Formula (G15)

[Chemical formula 30]

(G15)

where, in (G15), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, 4.1 g of bis(4-fluoro-3-nitrophenylsulfone) (Aldrich reagent, 12 mmol) was added and the solution was caused to react at 105° C. for 1 hour. Purification was performed by reprecipitation through the use of a large quantity of isopropyl alcohol, and thus there was obtained the oligomer a17' not containing an ionic group (terminal fluoro group), represented by the formula (G15). The number-average molecular weight was 10,800. The number-average molecular weight of the oligomer a17' not containing an ionic group was obtained as 10,149 (subtracting the linker moiety (molecular weight of 651))

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. Furthermore, the dimensional change rate was small, giving 10%, which showed excellent hot water resistance.

Moreover, through TEM observation, the co-continuous phase-separated structure with a domain size of 50 nm was able to be confirmed, and both the domain containing an ionic group and the domain not containing an ionic group formed continuous phase.

EXAMPLE 12

Synthesis of Oligomer a18' not Containing an Ionic Group, Represented by the General Formula (G16)

[Chemical formula 31]

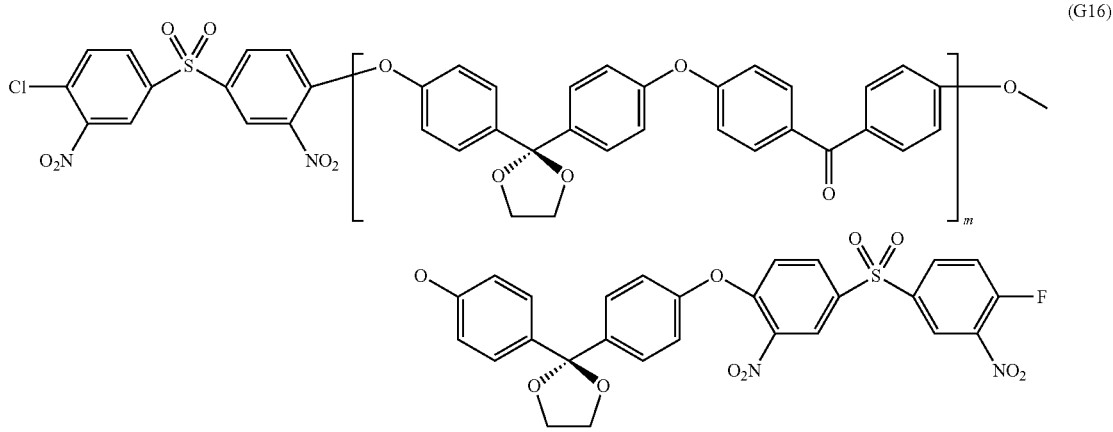

(G16)

Synthesis of Block Copolymer b15 Containing: Oligomer a12 as the Segment (a1) Containing an Ionic Group; Oligomer a17' as the Segment (a2) not Containing an Ionic Group; and Nitrodiphenylsulfone as the Linker Moiety The block copolymer b15 was obtained by the method of Example 7 except that the oligomer a11' not containing an ionic group (terminal fluoro group), was changed to 10 g (1 mmol) of the oligomer a17' not containing an ionic group (terminal fluoro group). The weight-average molecular weight was 400,000, and the molecular weight distribution was 2.2.

The block copolymer b15 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight of N-methylpyrrolidone (NMP) in which the obtained block copolymer b15 was dissolved, through the use of the method of Example 7.

where, in (G15), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered in 100 mL of N-methylpyrrolidone (NMP) and 30 mL of cyclohexane at 100° C., and then the resultant the content was heated to the cyclohexane was removed. Furthermore, 4.1 g of bis(4-chloro-3-nitrophenylsulfone) (Aldrich reagent, 12 mmol) was added and the solution was caused to react for 1 hour at 105° C. Purification was performed by reprecipitation through the use of a large quantity of isopropyl alcohol, and thus there was obtained the oligomer a18' not containing an ionic group (terminal chloro group), represented by the formula (G16). The number-average molecular weight was 10,600. The number-average molecular weight of the oligomer a18' not containing an ionic group was obtained as 9,949 (subtracting the linker moiety (molecular weight of 651))

Synthesis of Block Copolymer b16 Containing: Oligomer a12 as the Segment (a1) Containing an Ionic Group; Oligomer a18' as the Segment (a2) not Containing an Ionic Group; and Nitrodiphenylsulfone as the Linker Moiety The block copolymer b16 was obtained by the method of Example 7 except that the oligomer a11' not containing an ionic group (terminal fluoro group), was changed to 10 g (1 mmol) of the oligomer a18' not containing an ionic group (terminal chloro group). The weight-average molecular weight was 200,000, and the molecular weight distribution was 2.2.

The block copolymer b16 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight of N-methylpyrrolidone (NMP) in which the obtained block copolymer b16 was dissolved, through the use of the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. Furthermore, the dimensional change rate was small, giving 10%, which showed excellent hot water resistance.

Moreover, through TEM observation, the co-continuous phase-separated structure with a domain size of 50 nm was able to be confirmed, and both the domain containing an ionic group and the domain not containing an ionic group formed continuous phase.

EXAMPLE 13

Synthesis of Oligomer a19' not Containing an Ionic Group, Represented by the General Formula (G17)

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Further 1.7 g of 2,6-difluorobenzonitrile (Aldrich reagent, 12 mmol) was added and the solution was caused to react at 105° C. for 1 hour. Purification was performed by reprecipitation through the use of a large quantity of isopropyl alcohol, and thus there was obtained the oligomer a19' not containing an ionic group (terminal fluoro group), represented by the formula (G17). The number-average molecular weight was 10,200. The number-average molecular weight of the oligomer a19' not containing an ionic group was obtained as 10,100 (subtracting the linker moiety (101 of molecular weight)).

Synthesis of Block Copolymer b17 Containing: Oligomer a12 as the Segment (a1) Containing an Ionic Group; Oligomer a19' as the Segment (a2) not Containing an Ionic Group; and Benzonitrile as the Linker Moiety The block copolymer b17 was obtained by the method of Example 7 except that the oligomer a11' not containing an ionic group (terminal fluoro group), was changed to 10 g (1 mmol) of the oligomer a19' not containing an ionic group (terminal fluoro group). The weight-average molecular weight was 360,000, and the molecular weight distribution was 2.1.

The block copolymer b17 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

[Chemical formula 32]

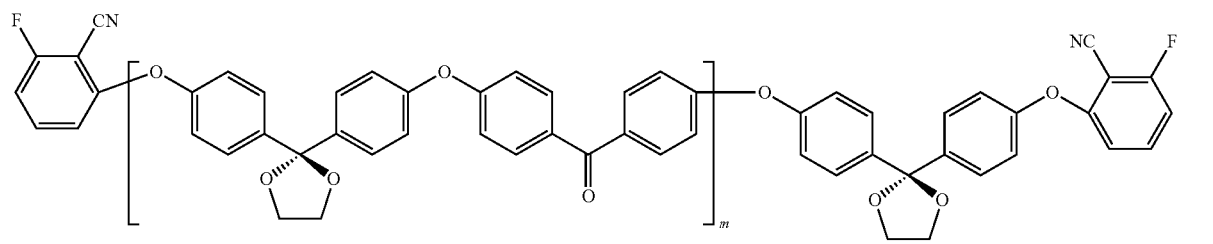

(G17)

where, in (G17), m is a positive integer.

A polymer electrolyte membrane was formed from a solution of 25% by weight of N-methylpyrrolidone (NMP) in which the obtained block copolymer b17 was dissolved, using the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. Furthermore, the dimensional change rate was small, giving 10%, which showed excellent hot water resistance.

Moreover, through TEM observation, the co-continuous phase-separated structure with a domain size of 50 nm was able to be confirmed, and both the domain containing an ionic group and the domain not containing an ionic group formed continuous phase.

EXAMPLE 14

Synthesis of Oligomer a20' not Containing an Ionic Group, Represented by the General Formula (G18)

[Chemical formula 33]

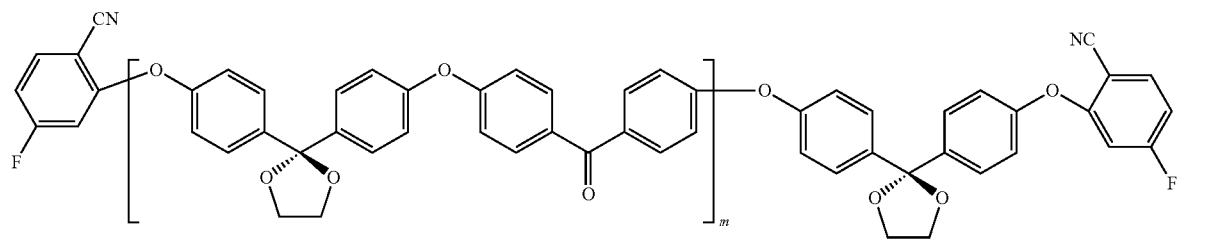

(G18)

where, in (G18), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered in 100 mL of N-methylpyrrolidone (NMP) and 30 mL of cyclohexane at 100° C., and then the resultant content was heated and the cyclohexane was removed. Furthermore, 1.7 g (12 mmol) of 2,4-difluorobenzonitrile was added and the solution was caused to react for 1 hour at 105° C. Purification was performed by reprecipitation through the use of a large quantity of isopropyl alcohol, and thus there was obtained the oligomer a20' not containing an ionic group (terminal fluoro group), represented by the formula (G18). The number-average molecular weight was 10,200. The number-average molecular weight of the oligomer a20' not containing an ionic group was obtained as 10,100 (subtracting the linker moiety (101 of molecular weight).

Synthesis of Block Copolymer b18 Containing: Oligomer a12 as the Segment (a1) Containing an Ionic Group; Oligomer a20' as the Segment (a2) not Containing an Ionic Group; and Benzonitrile as the Linker Moiety The block copolymer b18 was obtained by the method of Example 7 except that the oligomer a11' not containing an ionic group (terminal fluoro group), was changed to 10 g (1 mmol) of the oligomer a20' not containing an ionic group (terminal fluoro group). The weight-average molecular weight was 360,000, and the molecular weight distribution was 2.3.

The block copolymer b18 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight N-methylpyrrolidone (NMP) in which the obtained block copolymer b18 was dissolved, through the use of the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. Furthermore, the dimensional change rate was small, giving 10%, which showed excellent hot water resistance.

Moreover, through TEM observation, the co-continuous phase-separated structure with a domain size of 50 nm was able to be confirmed, and both the domain containing an ionic group and the domain not containing an ionic group formed continuous phase.

EXAMPLE 15

Synthesis of Oligomer a21' not Containing an Ionic Group, Represented by the General Formula (G19)

[Chemical formula 34]

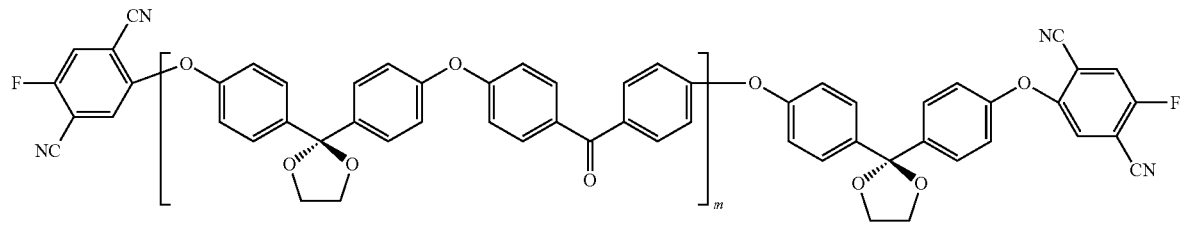

(G19)

where, in (G19), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Further 2.0 g (12 mmol) of 2,5-difluoro-1,4-benzodinitrile was added to bring the solution to react at 105° C. for 1 hour. Purification was performed by reprecipitation through the use of a large quantity of isopropyl alcohol, and thus there was obtained the oligomer a21' not containing an ionic group (terminal fluoro group), represented by the formula (G19). The number-average molecular weight was 10,300. The number-average molecular weight of the oligomer a21' not containing an ionic group was obtained as 10,010 (subtracting the linker moiety (290 of molecular weight)).

Synthesis of Block Copolymer b19 Containing:
Oligomer a12 as the Segment (a1) Containing an
Ionic Group; Oligomer a21' as the Segment (a2)
not Containing an Ionic Group; and Benzodinitrile
as the Linker Moiety The block copolymer b19 was obtained by the method of Example 7 except that the oligomer a11' not containing an ionic group (terminal fluoro group), was changed to 10 g (1 mmol) of the oligomer a21' not containing an ionic group (terminal fluoro group). The weight-average molecular weight was 200,000, and the molecular weight distribution was 2.3.

The block copolymer b19 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight of N-methylpyrrolidone (NMP) in which the obtained block copolymer b19 was dissolved, through the use of the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. Furthermore, the dimensional change rate was small, giving 10%, which showed excellent hot water resistance.

Furthermore, through TEM observation, the co-continuous phase-separated structure with a domain size of 50 nm was able to be confirmed, and both the domain containing an ionic group and the domain not containing an ionic group formed a continuous phase.

EXAMPLE 16

Synthesis of Oligomer a22' not Containing an Ionic Group, Represented by the General Formula (G20)

[Chemical formula 35]

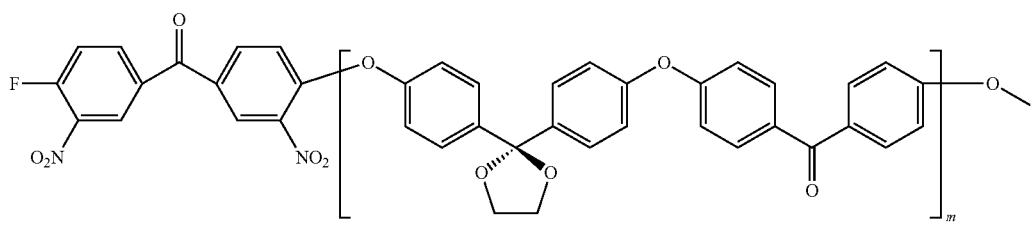

(G20)

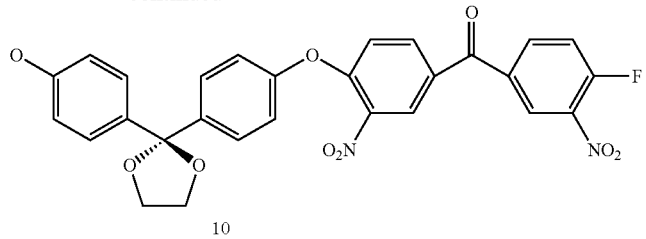

where, in (G20), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, 3.7 g of 4,4'-difluoro-3,3'-dinitrobenzophenone (Aldrich reagent, 12 mmol) was added and the solution was caused to react at 105° C. for 1 hour. Purification was performed by reprecipitation through the use of a large quantity of isopropyl alcohol, and thus there was obtained the oligomer a22' not containing an ionic group (terminal fluoro group), represented by the formula (G20). The number-average molecular weight was 10,500. The number-average molecular weight of the oligomer a22' not containing an ionic group was obtained as 10,230 (subtracting the linker moiety (270 of molecular weight)).

Synthesis of Block Copolymer b20 Containing: Oligomer a12 as the Segment (a1) Containing an Ionic Group; Oligomer a22' as the Segment (a2) not Containing an Ionic Group; and Dinitrobenzophenone as the Linker Moiety The block copolymer b20 was obtained by the method of Example 7 except that the oligomer a11' not containing an ionic group (terminal fluoro group), was changed to 10 g (1 mmol) of the oligomer a22' not containing an ionic group (terminal fluoro group). The weight-average molecular weight was 200,000, and the molecular weight distribution was 2.3.

The block copolymer b20 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed using a solution of 25% by weight of N-methylpyrrolidone (NMP) in which the obtained block copolymer b20 was dissolved, through the use of the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. The dimensional change rate was small, giving 10%, which showed excellent hot water resistance.

Furthermore, through TEM observation, the co-continuous phase-separated structure with a domain size of 50 nm was able to be confirmed, and both the domain containing an ionic group and the domain not containing an ionic group formed a continuous phase.

EXAMPLE 17

Synthesis of Oligomer a13' not Containing an Ionic Group, Represented by the General Formula (G21)

[Chemical formula 36]

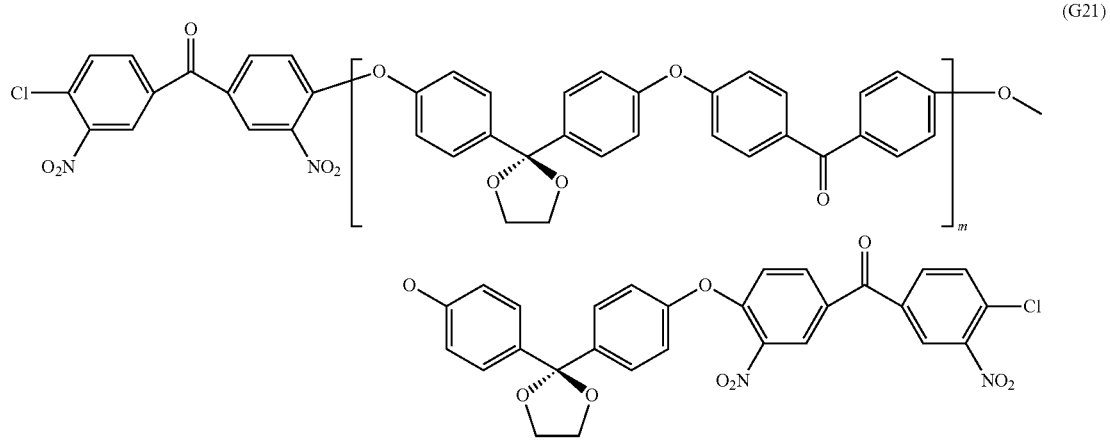

where, in (G21), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, 4.1 g of 4,4'-dichloro-3,3'-dinitrobenzophenone (Aldrich reagent, 12 mmol) was added and the solution was caused to react for 1 hour at 105° C. Purification was performed by reprecipitation through the use of a large quantity of isopropyl alcohol, and thus there was obtained the oligomer a23' not containing an ionic group (terminal chloro group), represented by the formula (G21). The number-average molecular weight was 10,610. The number-average molecular weight of the oligomer a23' not containing an ionic group was obtained as 10,340 (subtracting the linker moiety (270 of molecular weight)).

Synthesis of Block Copolymer b21 Containing: Oligomer a12 as the Segment (a1) Containing an Ionic Group; Oligomer a23' as the Segment (a2) not Containing an Ionic Group; and Dinitrobenzophenone as the Linker Moiety The block copolymer b21 was obtained by the method of Example 7 except that the oligomer a11' not containing an ionic group (terminal fluoro group), was changed to 10 g (1 mmol) of the oligomer a23' not containing an ionic group (terminal chloro group). The weight-average molecular weight was 200,000, and the molecular weight distribution was 2.3.

The block copolymer b21 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed using a solution of 25% by weight of N-methylpyrrolidone (NMP) in which the obtained block copolymer b21 was dissolved, through the use of the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and through visual observation, the membrane was found to be a transparent and homogeneous membrane. The proton conductivity was 250 mS/cm at 80° C. and 85% RH, and 2 mS/cm at 80° C. and 25% RH, which showed excellent proton conduction under low-humidification conditions. The dimensional change rate was small, giving 10%, which showed excellent hot water resistance.

Furthermore, through TEM observation, the co-continuous phase-separated structure with a domain size of 50 nm was able to be confirmed, and both the domain containing an ionic group and the domain not containing an ionic group formed continuous phase.

EXAMPLE 18

Synthesis of Oligomer a24' not Containing an Ionic Group, Represented by the General Formula (G22)

[Chemical formula 37]

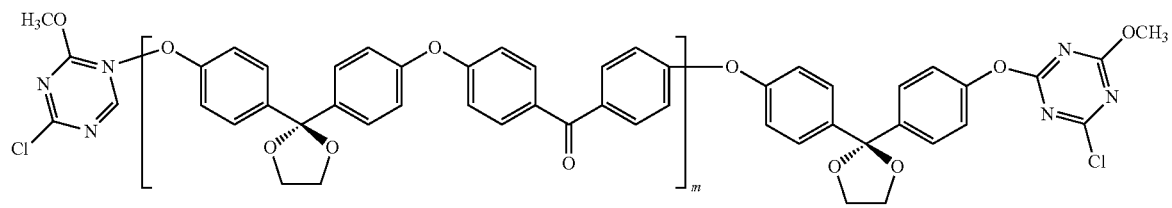

(G22)

where, in (G22), m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane. Then, resultant the content was heated and the cyclohexane was removed. Furthermore, 2.2 g of 2,4-dichloro-6-methoxy-1,3,5-triazine (Aldrich reagent, 12 mmol) was added and the solution was caused to react for 1 hour at 105° C. Purification was performed by reprecipitation through the use of a large quantity of isopropyl alcohol, and thus there was obtained the oligomer a24' not containing an ionic group (terminal chloro group), represented by the formula (G22). The number-average molecular weight was 10,119. The number-average molecular weight of the oligomer a24' not containing an ionic group was obtained as 10,010 (subtracting the linker moiety (109 of molecular weight)).

Synthesis of Block Copolymer b22 Containing: Oligomer a12 as the Segment (a1) Containing an Ionic Group; Oligomer a24' as the Segment (a2) not Containing an Ionic Group; and Methoxytriazine as the Linker Moiety The block copolymer b22 was obtained by the method of Example 7 except that the oligomer a11' not containing an ionic group (terminal fluoro group), was changed to 10 g (1 mmol) of the oligomer a22' not containing an ionic group (terminal chloro group). The weight-average molecular weight was 200,000, and the molecular weight distribution was 2.3.

The block copolymer b22 contained 100 mol % of constituent unit represented by the general formula (S1) as the segment (A1) containing an ionic group, and 100 mol % of constituent unit represented by the general formula (S2) as the segment (A2) not containing an ionic group. The molecular weight-holding rate was 95%, exhibiting extremely excellent chemical stability. The effect was presumably due to the increased amount of electron-withdrawing group.

A polymer electrolyte membrane was formed from a solution of 25% by weight of N-methylpyrrolidone (NMP) in which the obtained block copolymer b22 was dissolved, using the method of Example 7.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and visual observation confirmed transparent and homogeneous membrane. The proton conductivity was 250 mS/cm at 80° C. and 85% RH, and 2 mS/cm at 80° C. and 25% RH, which showed excellent proton conduction under low-humidification conditions. The dimensional change rate was small, giving 10%, which showed excellent hot water resistance.

Furthermore, TEM observation confirmed the co-continuous phase-separated structure with 50 nm of domain size. Both the domain containing an ionic group and the domain not containing an ionic group formed continuous phase.

EXAMPLE 19

Synthesis of Oligomer a25' Containing an Ionic Group, Represented by the General Formula (G23)

use of a large quantity of isopropyl alcohol, and thus there was obtained the oligomer a25' containing an ionic group (terminal fluoro group), represented by the formula (G23). The number-average molecular weight was 15,900. The number-average molecular weight of the oligomer a25' containing an ionic group was obtained as 15,430 (subtracting the linker moiety (470 of molecular weight).

Synthesis of Block Copolymer b23 Containing: Oligomer a25' as the Segment (a1) Containing an Ionic Group; Oligomer a11 as the Segment (a2) not Containing an Ionic Group; and Diphenylsulfone as the Linker Moiety To a 500 mL three-neck flask equipped with an agitator, a nitrogen gas inlet tube, and a Dean-Stark trap, there were added 0.56 g of potassium carbonate (Aldrich reagent, 4 mmol), and 10 g (1 mmol) of the oligomer a11 not containing an ionic group (terminal OM group). After nitrogen purge, the resultant content was dewatered at 100° C. in 100 mL of N-methylpyrrolidone (NMP) and 30 mL of cyclohexane, and then the resultant content was heated to remove the cyclohexane. Further 15 g (1 mmol) of oligomer a25' containing an ionic group (terminal fluoro group), was added and the solution was caused to react for 24 hour at 105° C. Purification was performed by reprecipitation through the use of a large quantity of isopropyl alcohol, and thus there was obtained the block copolymer b23. The weight-average molecular weight was 250,000, and the molecular weight distribution was 2.1.

[Chemical Formula 38]

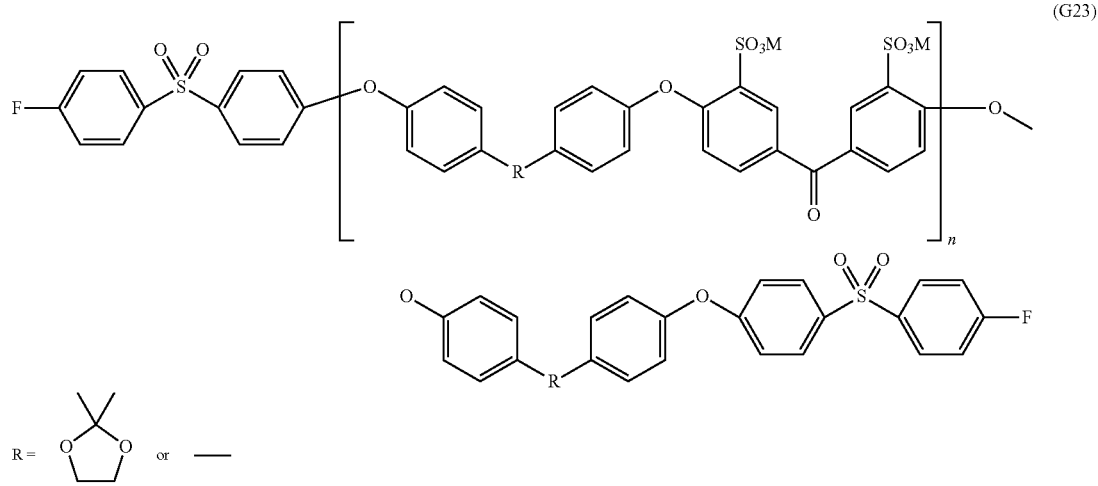

where, in (G23), M is Na or K, and m is a positive integer.

To a 500 mL three-neck flask equipped with an agitator, a nitrogen gas inlet tube, and a Dean-Stark trap, there were added 1.1 g of potassium carbonate (Aldrich reagent, 8 mmol), and 32.0 g (2 mmol) of the oligomer a12 containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, 3.0 g of bis(4-fluorophenylsulfone) (Aldrich reagent, 12 mmol) was added and the solution was caused to react at 105° C. for 1 hour. Purification was performed by reprecipitation through the The block copolymer b23 contained 50 mol % of the constituent unit represented by the general formula (S1) as the segment (A1) containing an ionic group, and 100 mol % of the constituent unit represented by the general formula (S2) as the segment (A2) not containing an ionic group. The molecular weight-holding rate was 81% to show excellent chemical stability.

Thus obtained block copolymer b23 was dissolved in 25% by weight of N-methylpyrrolidone (NMP). The solution was pressure-filtered using a glass fiber filter, which filtered product was treated by performing flow-expanding coating for coating on a glass substrate. Then the glass substrate was dried at 100° C. for 4 hours, followed by heat-treating in a nitrogen atmosphere at 150° C. for 10 minutes to obtain a polyketal ketone membrane (thickness of 25 μm). The solubility of the polymer was extremely high. The membrane was immersed in 10% by weight of sulfuric acid aqueous solution at 95° C. for 24 hours to conduct proton substitution and deprotection, and then was immersed in a large excess volume of pure water for 24 hours, followed by sufficiently rinsing, thus obtained the polymer electrolyte membrane.

The ion-exchange capacity obtained from the neutralization titration was 1.8 meq/g, and the molar composition ratio (A1/A2) obtained from $^1$H-NMR was 44 mole/56 mol=0.79, which showed no residual ketal group. The electrolyte membrane was extremely tough, and visual observation confirmed transparent and homogeneous membrane. The proton conductivity was 250 mS/cm at 80° C. and 85% RH, and 2 mS/cm at 80° C. and 25% RH, which showed excellent proton conduction under low-humidification conditions. The dimensional change rate was small, giving 10%, which showed excellent hot water resistance.

Furthermore, TEM observation confirmed the co-continuous phase-separated structure with 20 nm of domain size. Both the domain containing an ionic group and the domain not containing an ionic group formed continuous phase.

INDUSTRIAL APPLICABILITY

The polymer electrolyte material and the polymer electrolyte membrane according to the present invention are applicable to various electrochemical apparatus such as fuel cell, water electrolyzer, and chloroalkali electrolyzer. Among these apparatus, use in fuel cell is preferred, and specifically suitable use is for fuel cell utilizing hydrogen as the fuel.

The uses of the polymer electrolyte fuel cell of the present invention are not specifically limited, and preferred uses are: substitution of conventional primary cell or rechargeable cell; and hybrid power sources therewith. These preferred uses include: handy equipment such as cell phone, personal computer, PDA, video camera, and digital camera; household electric appliances such as cordless vacuum cleaner; toys; power source of mobile body such as motor bicycle, motorbike, vehicle (such as automobile, bus, and truck), ship, and railway; and stationary power generator.

The invention claimed is:
1. A block copolymer comprising:
a segment (A1) containing an ionic group;
a segment (A2) not containing an ionic group; and
a linker moiety connecting the (A1) and (A2) segments, wherein the segment (A1) containing an ionic group comprises a constituent unit represented by a general formula (S1) shown below:

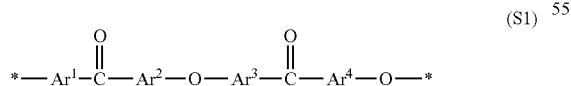

where, in the general formula (S1), $Ar^1$ to $Ar^4$ are each an arbitrary divalent arylene group;
$Ar^1$ and/or $Ar^2$ contain an ionic group, and $Ar^3$ and $Ar^4$ can each contain or not contain an ionic group;
$Ar^1$ to $Ar^4$ may each be arbitrarily substituted, and in $Ar^1$ to $Ar^4$, two or more kinds of arylene groups can be used independently of each other; and the * symbol of the general formula (S1) comprises a bond moiety, wherein the segment (A2) not containing an ionic group comprises a constituent unit represented by a general formula (S2) described below,

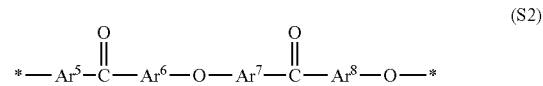

where, in the general formula (S2), $Ar^5$ to $Ar^8$ are each an arbitrary divalent arylene group, which $Ar^5$ to $Ar^8$ can each be arbitrarily substituted, and do not contain an ionic group;

in $Ar^5$ to $Ar^8$, two or more kinds of arylene groups can be used independently of each other; and the * symbol of the general formula (S2) comprises a bond moiety;

wherein the segment (A2) not containing an ionic group includes the constituent unit represented by the general formula (S2) in the content of 20 mol % or larger;

wherein the linker moiety comprises:
(a) any of the general formulae (L1) to (L7),

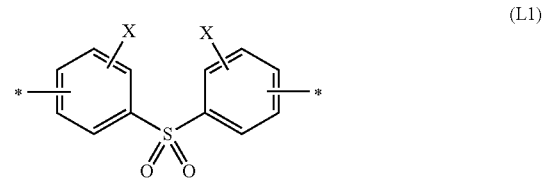

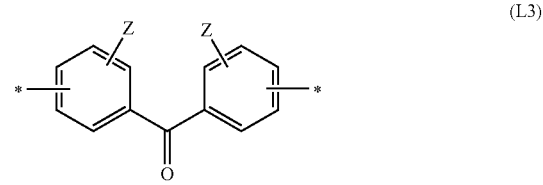

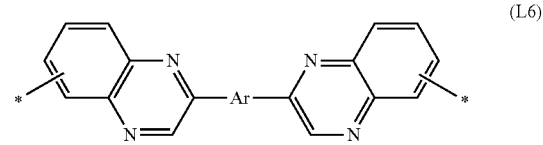

-continued

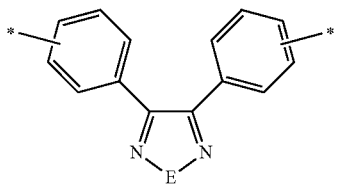
(L7)

where, in the general formula (L1), X is an electron-withdrawing group selected from the group consisting of H, $NO_2$, CN, $CF_3$, Cl, Br, and I;

in the general formula (L2), Y is an electron-withdrawing group selected from the group consisting of $NO_2$, CN, $CF_3$, Cl, Br, and I;

in the general formula (L3), Z is an electron-withdrawing group selected from the group consisting of $NO_2$, CN, $CF_3$, Cl, Br, and I;

in the general formula (L5), R is an arbitrary organic group; in the general formula (L6), Ar is an arbitrary arylene group; and in the general formula (L7), E is oxygen or sulfur;

the general formulae (L1) to (L7) can each be further substituted with an electron-withdrawing group, and in the general formulae (L1) to (L7), two or more kinds of X to Z, R, Ar, and E can be used independently of each other; and the * symbol of the general formulae (L1) to (L7) comprises a bond moiety.

2. The block copolymer according to claim 1, wherein the ionic group is a sulfonic acid group.

3. The block copolymer according to claim 1, wherein the ion-exchange capacity is in a range of 1.5 to 3.5 meq/g.

4. The block copolymer according to claim 1, wherein the molar composition ratio of the segment (A1) containing an ionic group to the segment (A2) not containing an ionic group, A1/A2, is 0.2 or larger and 5 or smaller.

5. The block copolymer according to claim 1, wherein the constituent unit represented by the general formula (S2) is expressed by the formula (S3) described below.

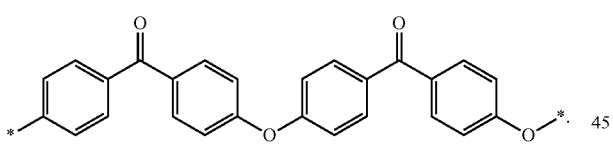
(S3)

6. The block copolymer according to claim 1, wherein the constituent unit represented by the general formula (S1) is expressed by the formula (S4) described below,

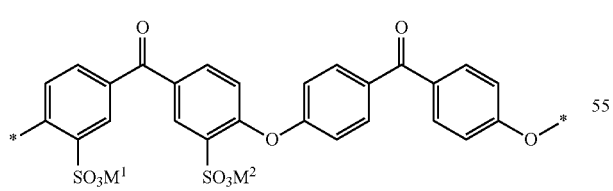
(S4)

where, in the formula (S4), $M^1$ and $M^2$ are each a hydrogen atom, a metal cation, or an ammonium cation; and $M^1$ and $M^2$ may each be represented by two or more kinds of groups.

7. The block copolymer according to claim 1, wherein the number-average molecular weight of the segment (A1) containing an ionic group and the segment (A2) not containing an ionic group is 5,000 or larger and 50,000 or smaller.

8. A method of manufacturing the block copolymer according to claim 1, comprising:
(1) introducing a linker moiety through a reaction between a linker compound and —OM group at both terminals of a segment (A1) or a segment (A2):
the segment (A1) containing a constituent unit represented by the general formula (S1) described below and/or a constituent unit serving as a precursor of the constituent unit represented by the general formula (S1), and having —OM group (M is a hydrogen atom, a metal cation, or an ammonium cation) at both terminals thereof, and further containing an ionic group; the segment (A2) containing a constituent unit represented by the general formula (S2) described below and/or a constituent unit serving as a precursor of the constituent unit represented by the general formula (S2), and having —OM group (M is a hydrogen atom, a metal cation, or an ammonium cation) at both terminals thereof, and further not containing an ionic group, wherein the segment (A2) not containing an ionic group includes the constituent unit represented by the general formula (S2) in the content of 20 mol % or larger;
(2) manufacturing a block copolymer or a precursor of the block copolymer through polymerization of linker moieties at both terminals of the segment, to which the linker moiety synthesized in the step (1) is introduced, with the —OM groups at both terminals of another segment,

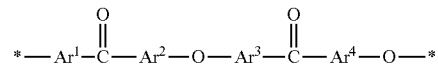
(S1)

where, in the general formula (S1), $Ar^1$ to $Ar^4$ are each an arbitrary divalent arylene group; $Ar^1$ and/or $Ar^2$ contains an ionic group; $Ar^3$ and $Ar^4$ can each contain or not contain an ionic group; $Ar^1$ to $Ar^4$ can each be arbitrarily substituted, in $Ar^1$ to $Ar^4$, two or more kinds of arylene groups can be used independently of each other; and the * symbol of the general formula (S1) comprises a bond moiety,

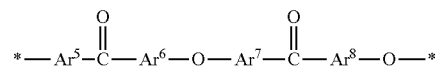
(S2)

where, in the general formula (S2), $Ar^5$ to $Ar^8$ are each an arbitrary divalent arylene group; $Ar^5$ to $Ar^8$ can each be arbitrarily substituted, and do not contain an ionic group;

in $Ar^5$ to $Ar^8$, two or more kinds of arylene groups can be used independently of each other; and the * symbol of the general formula (S2) comprises a bond moiety;

wherein the linker moiety comprises:
(a) any of the general formulae (M1) to (M7) described below,

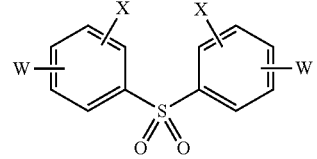
(M1)

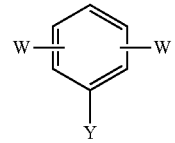
(M2)

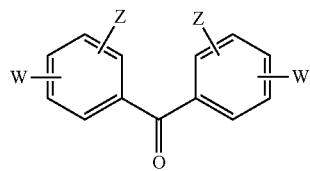 (M3)

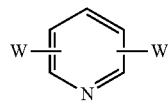 (M4)

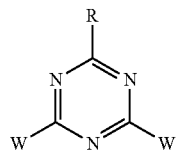 (M5)

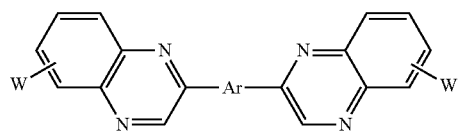 (M6)

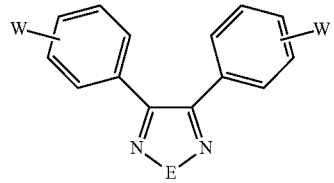 (M7)

where, in the general formulae (M1) to (M7), W is Cl or F;

in the general formula (M1), X is an electron-withdrawing group selected from the group consisting of H, $NO_2$, CN, $CF_3$, Cl, Br, and I;

in the general formula (M2), Y is an electron-withdrawing group selected from the group consisting of $NO_2$, CN, $CF_3$, Cl, Br, and I;

in the general formula (M3), Z is an electron-withdrawing group selected from the group consisting of $NO_2$, CN, $CF_3$, Cl, Br, and I; in the general formula (M5), R is an arbitrary organic group; in the general formula (M6), Ar is an arbitrary arylene group; and in the general formula (M7), E is oxygen or sulfur;

the general formulae (M1) to (M7) can each further be substituted with an electron-withdrawing group, and in the general formulae (M1) to (M7), two or more kinds of X to Z, R, Ar, and E can be used independently of each other.

9. The method of manufacturing the block copolymer according to claim 8, wherein there is used at least one kind of linker compound selected from the group consisting of formulae (M1-1), (M1-2), (M1-8), (M2-1), (M2-2), (M2-3), (M5-1), M5-4), and (M7-2) described below,

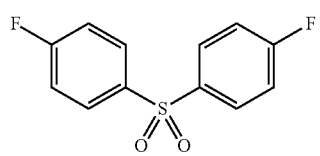 (M1-1)

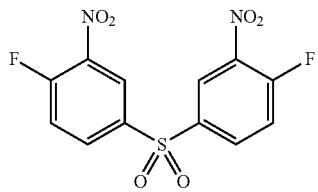 (M1-2)

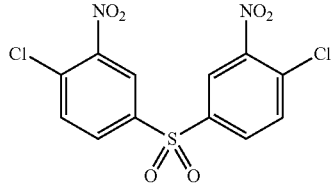 (M1-8)

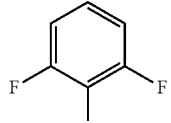 (M2-1)

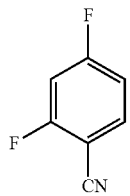 (M2-2)

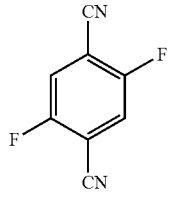 (M2-3)

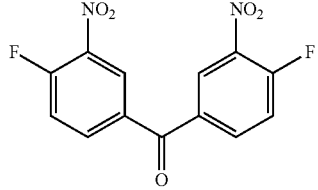 (M5-1)

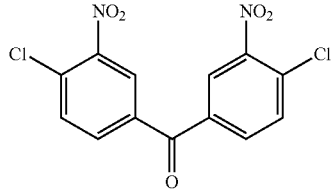 (M5-4)

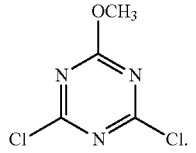 (M7-2)

10. A polymer electrolyte material comprising the block copolymer according to claim 1.

11. A polymer electrolyte form article comprising the polymer electrolyte material according to claim 10.

12. A polymer electrolyte fuel cell comprising the polymer electrolyte material according to claim 10.

13. A block copolymer comprising:
a segment (A1) containing an ionic group;
a segment (A2) not containing an ionic group; and
a linker moiety connecting the (A1) and (A2) segments, wherein the segment (A1) containing an ionic group comprises a constituent unit represented by a general formula (S1) shown below:

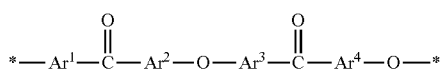
(S1)

where, in the general formula (S1), $Ar^1$ to $Ar^4$ are each an arbitrary divalent arylene group;
$Ar^1$ and/or $Ar^2$ contain an ionic group, and $Ar^3$ and $Ar^4$ can each contain or not contain an ionic group;
$Ar^1$ to $Ar^4$ may each be arbitrarily substituted, and in $Ar^1$ to $Ar^4$, two or more kinds of arylene groups can be used independently of each other; and the * symbol of the general formula (S1) comprises a bond moiety;
wherein the linker moiety comprises any of the general formulae (L1) to (L7),

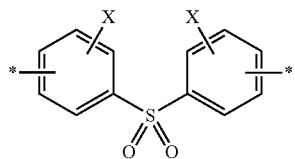
(L1)

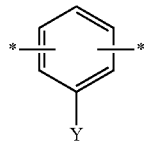
(L2)

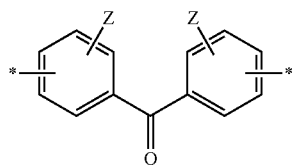
(L3)

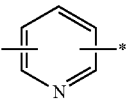
(L4)

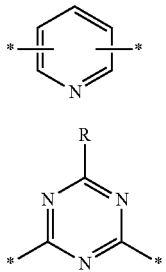
(L5)

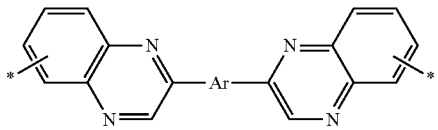
(L6)

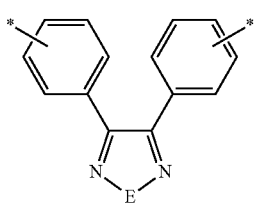
(L7)

where, in the general formula (L1), X is an electron-withdrawing group selected from the group consisting of H, $NO_2$, CN, $CF_3$, Cl, Br, and I;
in the general formula (L2), Y is an electron-withdrawing group selected from the group consisting of $NO_2$, CN, $CF_3$, Cl, Br, and I;
in the general formula (L3), Z is an electron-withdrawing group selected from the group consisting of $NO_2$, CN, $CF_3$, Cl, Br, and I;
in the general formula (L5), R is an arbitrary organic group; in the general formula (L6), Ar is an arbitrary arylene group; and
in the general formula (L7), E is oxygen or sulfur;
the general formulae (L1) to (L7) can each be further substituted with an electron-withdrawing group, and in the general formulae (L1) to (L7), two or more kinds of X to Z, R, Ar, and E can be used independently of each other; and the * symbol of the general formulae (L1) to (L7) comprises a bond moiety.

* * * * *